United States Patent
Dame et al.

(10) Patent No.: US 10,112,351 B2
(45) Date of Patent: Oct. 30, 2018

(54) METHOD FOR MANUFACTURING SLIDE-ROOM FOR RECREATIONAL VEHICLE

(71) Applicant: Composite Solutions, Inc., Junction City, OR (US)

(72) Inventors: Dennis Dame, Harrisburg, OR (US); Jeffrey Chase, Junction City, OR (US)

(73) Assignee: Composite Solutions, Inc., Eugene, OR (US)

( * ) Notice: Subject to any disclaimer, the term of this patent is extended or adjusted under 35 U.S.C. 154(b) by 1043 days.

(21) Appl. No.: 14/065,038

(22) Filed: Oct. 28, 2013

(65) Prior Publication Data
US 2014/0117590 A1    May 1, 2014

Related U.S. Application Data

(60) Provisional application No. 61/720,315, filed on Oct. 30, 2012.

(51) Int. Cl.
*B29C 70/42* (2006.01)
*B29C 70/44* (2006.01)
*B29L 31/30* (2006.01)
*B29C 33/30* (2006.01)

(52) U.S. Cl.
CPC .......... *B29C 70/443* (2013.01); *B29C 33/301* (2013.01); *B29C 33/306* (2013.01); *B29L 2031/3005* (2013.01)

(58) Field of Classification Search
CPC .... B29C 33/301; B29C 33/306; B29C 33/307
See application file for complete search history.

(56) References Cited

U.S. PATENT DOCUMENTS

| 4,491,362 | A |   | 1/1985 | Kennedy |
| 4,528,878 | A | * | 7/1985 | Gerber ................ B25B 11/005 83/100 |
| 4,913,485 | A |   | 4/1990 | Moffatt et al. |
| 5,735,639 | A |   | 4/1998 | Payne et al. |

(Continued)

OTHER PUBLICATIONS

Photographs of various slide-rooms, publicly used prior to Jan. 20, 2010.

(Continued)

*Primary Examiner* — Ryan M Ochylski
(74) *Attorney, Agent, or Firm* — Klarquist Sparkman, LLP

(57) ABSTRACT

A slide-room for installation in a recreational vehicle or other structure is disclosed. The slide-room comprises a shell, which can be constructed from fiberglass. The shell comprises an end wall, a ceiling, a floor, two opposing side walls, and a flange extending from the end wall, wherein the end wall, the ceiling, the floor, the side walls and the flange comprise a one-piece, unitary construction. Also disclosed are methods for molding composite components, such as slide-room. In one specific implementation, the shell for a slide-room is formed from fiberglass using a vacuum-assisted resin transfer process. During the vacuum-assisted resin transfer process, a mold apparatus can include a perimeter seal system to inhibit resin from flowing into spaces between mating components of the mold. The perimeter seal system can include clamp seal assemblies and/or vacuum seal assemblies.

19 Claims, 27 Drawing Sheets

(56) References Cited

U.S. PATENT DOCUMENTS

| | | | |
|---|---|---|---|
| 6,149,218 | A | 11/2000 | Tremblay et al. |
| 6,224,126 | B1 | 5/2001 | Martin et al. |
| 6,325,437 | B2 | 12/2001 | Hiebert et al. |
| 6,402,216 | B1 | 6/2002 | McManus et al. |
| D460,721 | S | 7/2002 | Rex |
| 6,422,628 | B1 | 7/2002 | Bortell |
| D461,144 | S | 8/2002 | Rex |
| 6,527,336 | B2 | 3/2003 | Hernandez et al. |
| 6,536,821 | B1 | 3/2003 | Gardner |
| 6,575,514 | B2 | 6/2003 | McManus et al. |
| 6,712,414 | B2 | 3/2004 | Morrow |
| D488,744 | S | 4/2004 | Ciarfello |
| 6,729,677 | B2 | 5/2004 | Gurdjian et al. |
| D522,923 | S | 6/2006 | Genung |
| 7,354,088 | B2 | 4/2008 | Garceau et al. |
| 7,527,313 | B2 | 5/2009 | Peter |
| 7,614,675 | B2 | 11/2009 | Kunz |
| 7,717,485 | B1 | 5/2010 | Hanser et al. |
| 7,731,256 | B1 | 6/2010 | Wivinis |
| 8,141,927 | B2 | 3/2012 | Kreil |
| 8,454,072 | B2 | 6/2013 | Chase et al. |
| 8,603,289 | B2 | 12/2013 | Chase et al. |
| 2003/0151170 | A1* | 8/2003 | Elgner ................ B29C 49/4242 264/540 |
| 2007/0194586 | A1 | 8/2007 | Gardner |
| 2008/0073925 | A1 | 3/2008 | Ksiezopolski et al. |
| 2008/0211130 | A1 | 9/2008 | Rydin et al. |
| 2008/0308960 | A1 | 12/2008 | Rydin et al. |
| 2012/0035813 | A1 | 2/2012 | Kreil |
| 2012/0067511 | A1* | 3/2012 | Chase ................ B29C 70/443 156/243 |
| 2012/0298296 | A1* | 11/2012 | Thompson .......... B29C 43/3607 156/285 |
| 2013/0014888 | A1* | 1/2013 | Miller ................ B29C 33/0011 156/247 |

OTHER PUBLICATIONS

Office Action from the United States Patent & Trademark Office in co-pending U.S. Appl. No. 29/383,703, dated Jun. 27, 2012.
Office Action from the United States Patent & Trademark Office in co-pending U.S. Appl. No. 13/237,746, dated Aug. 14, 2012.
Office Action from the United States Patent & Trademark Office in co-pending U.S. Appl. No. 29/383,703, dated Jan. 4, 2013.
Statement of Dennis Dame, dated Feb. 5, 2013, 4 pages.

* cited by examiner

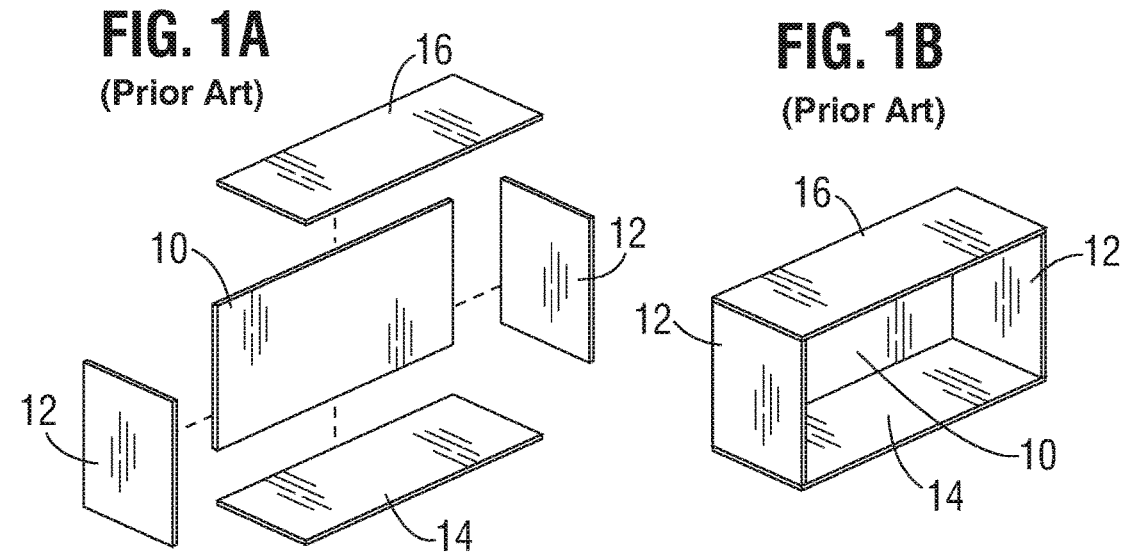
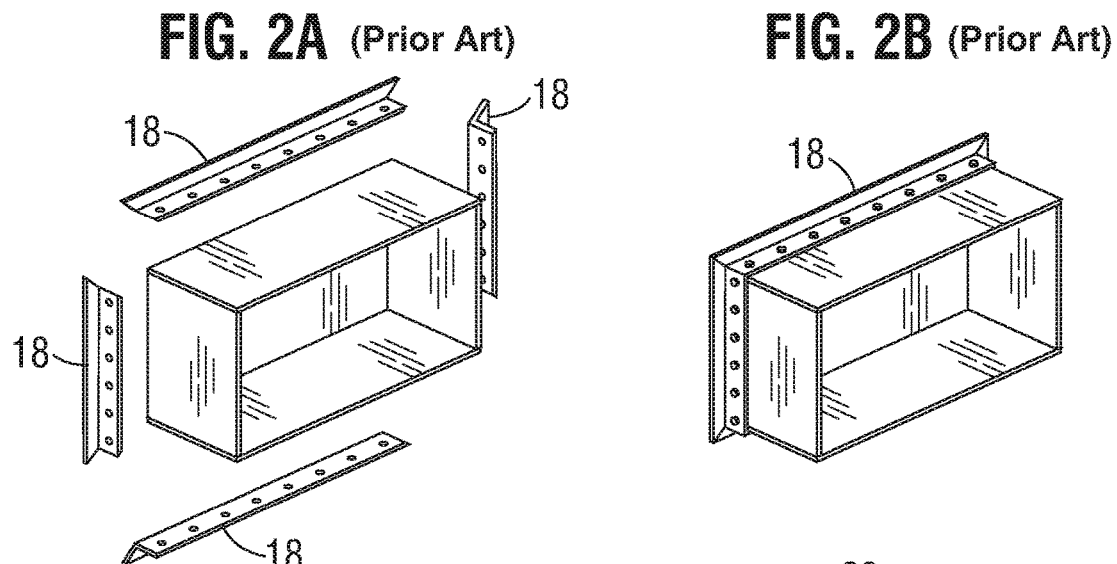
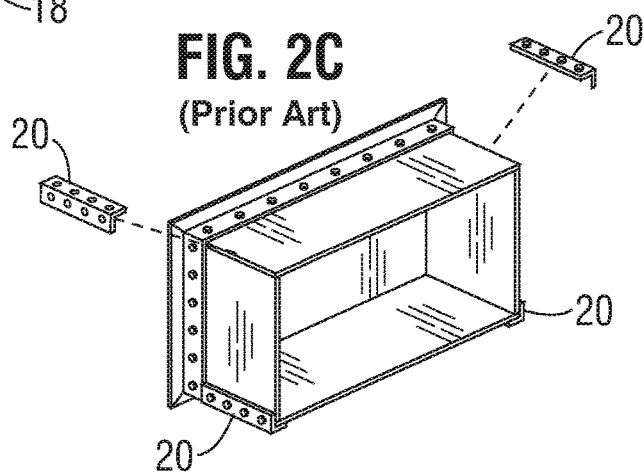

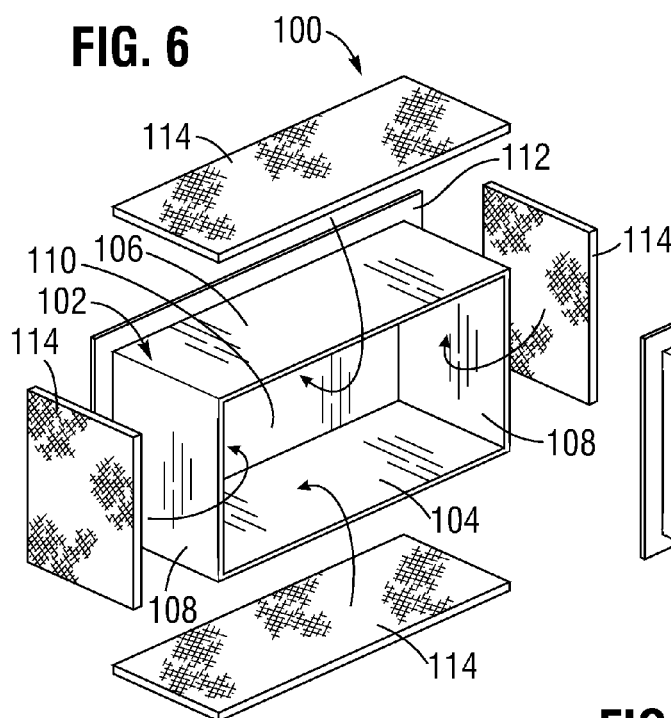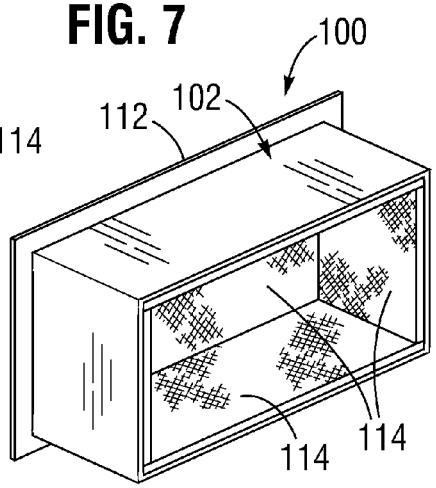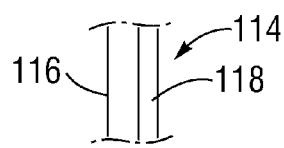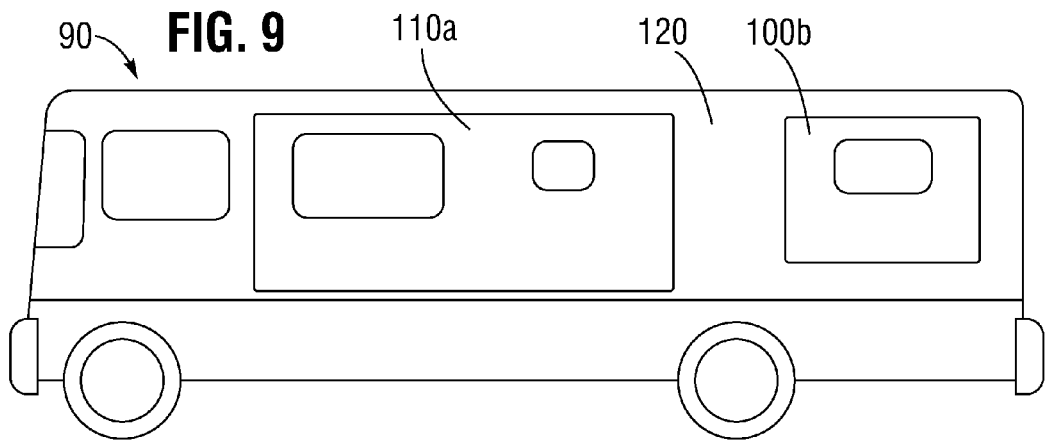

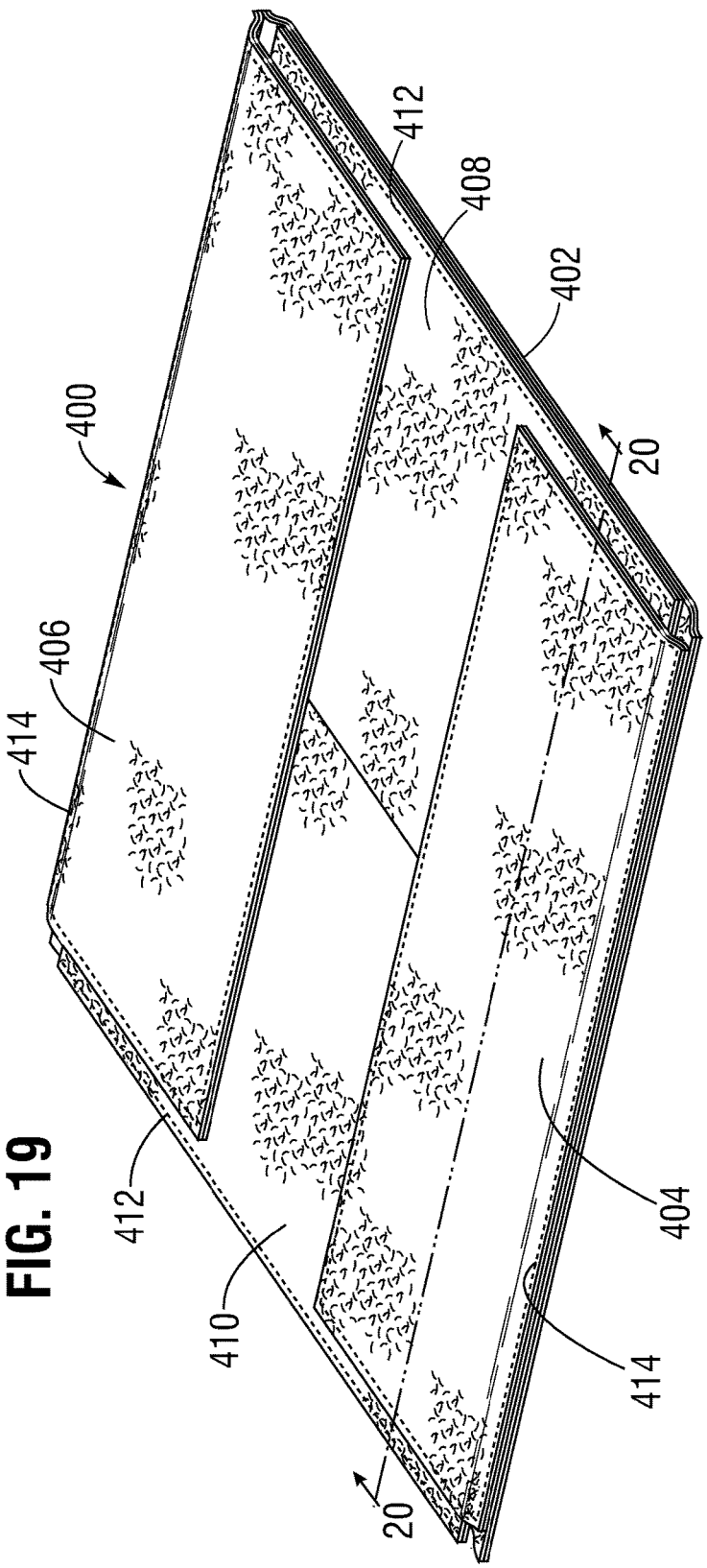
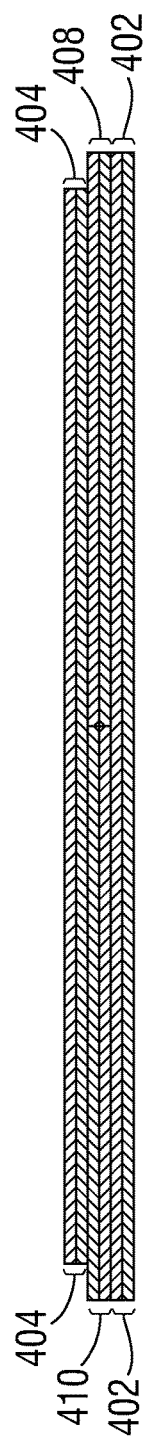
FIG. 19
FIG. 20

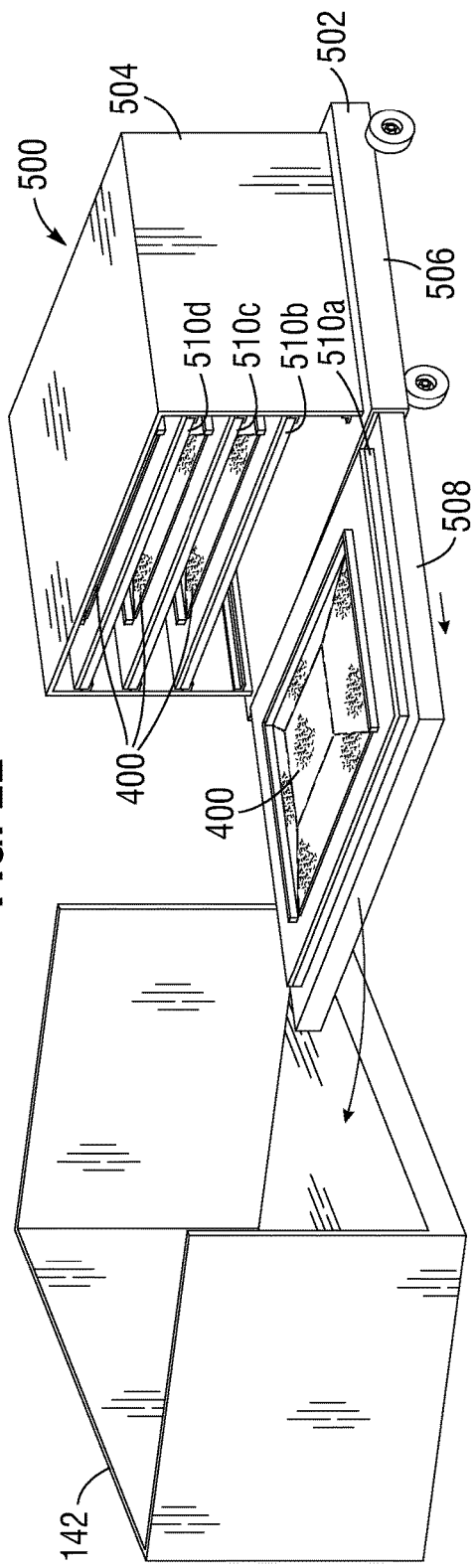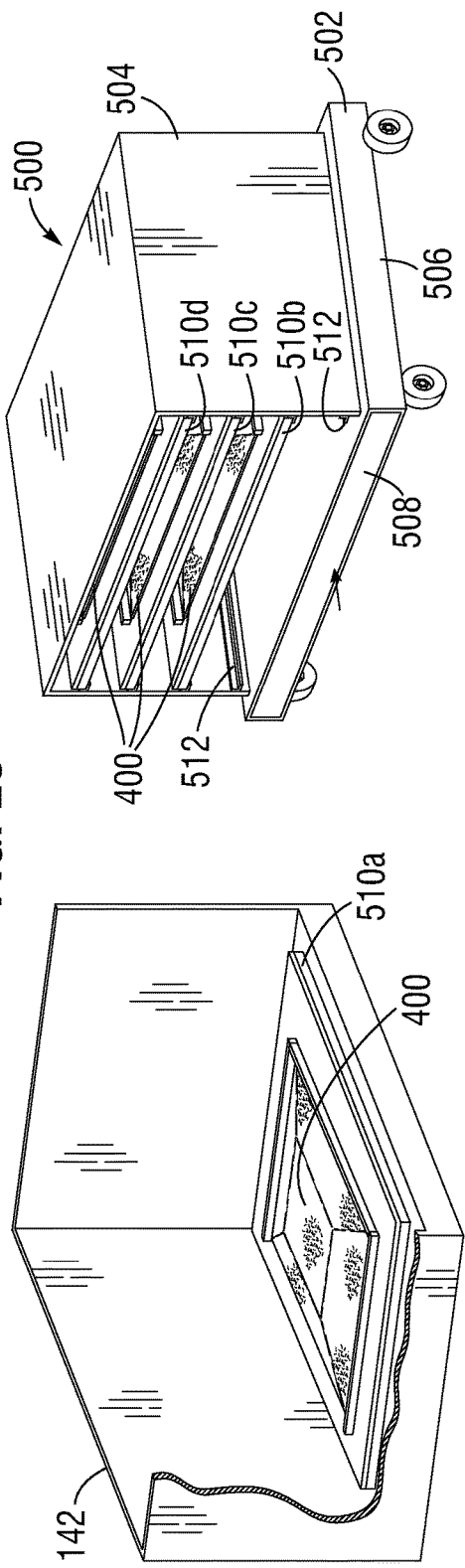

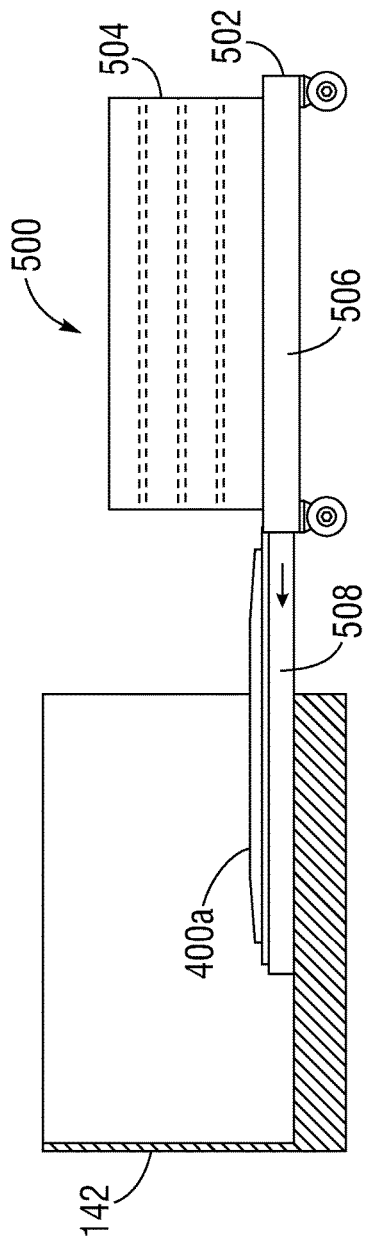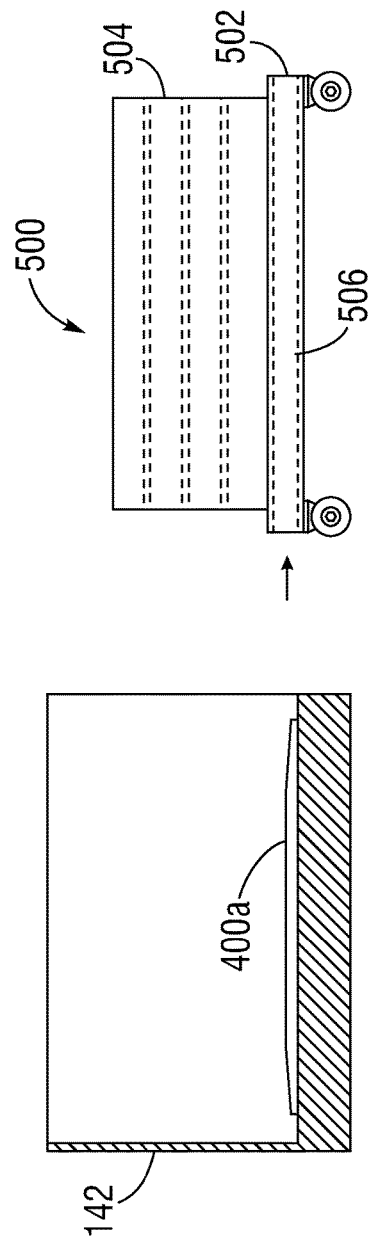

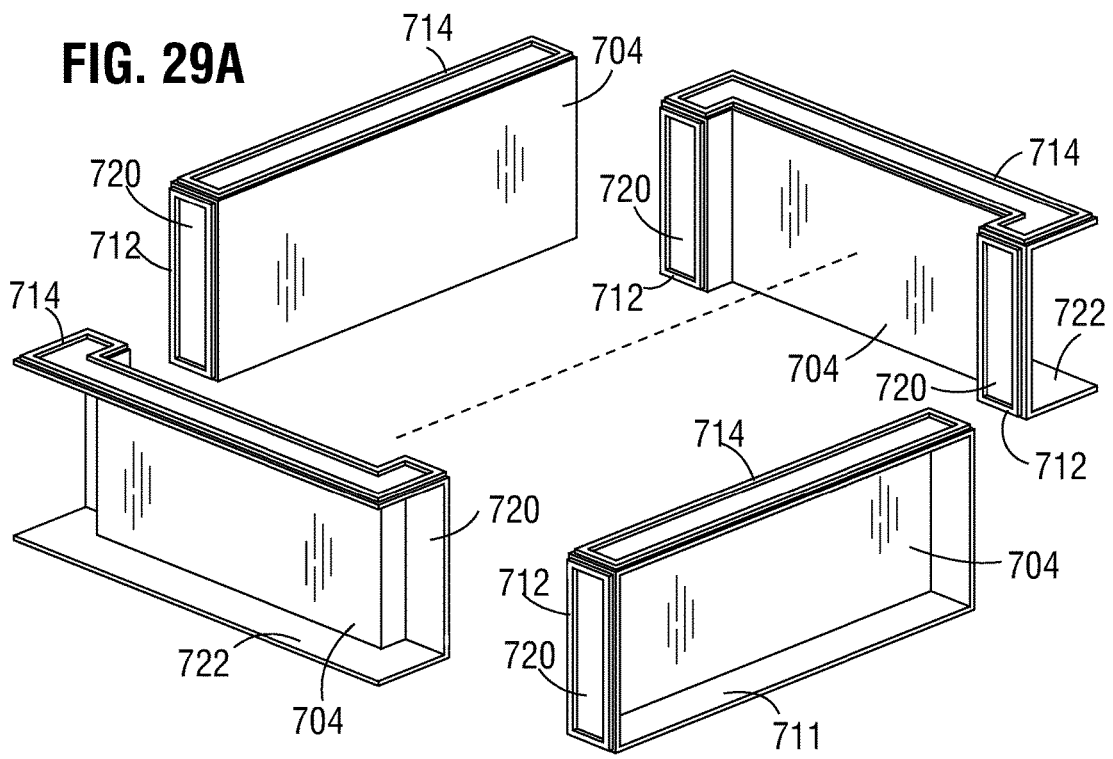
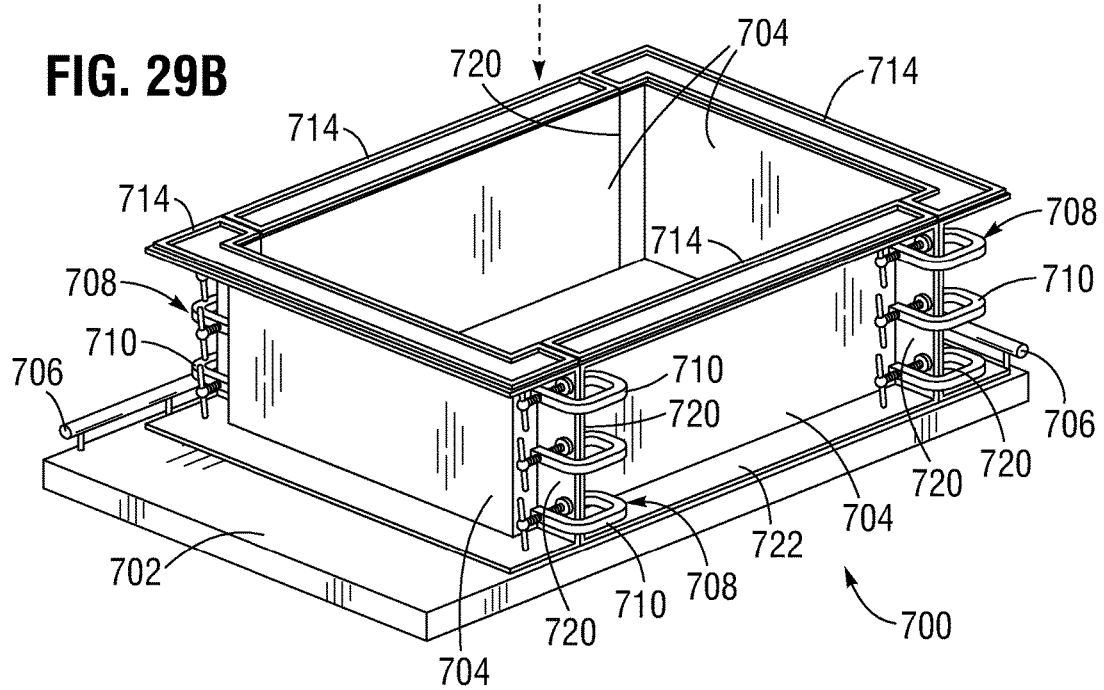

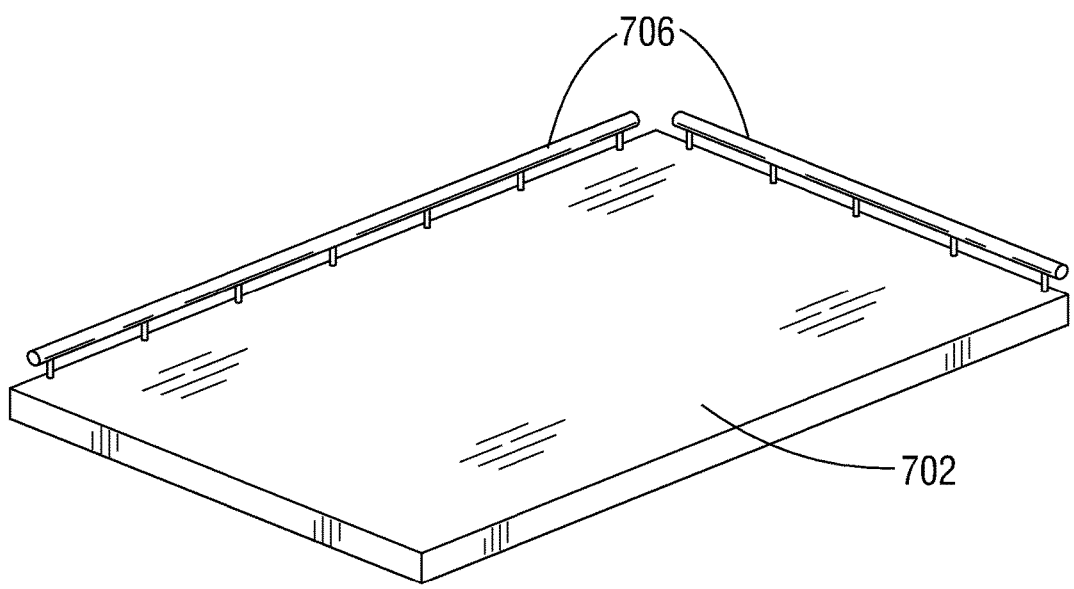

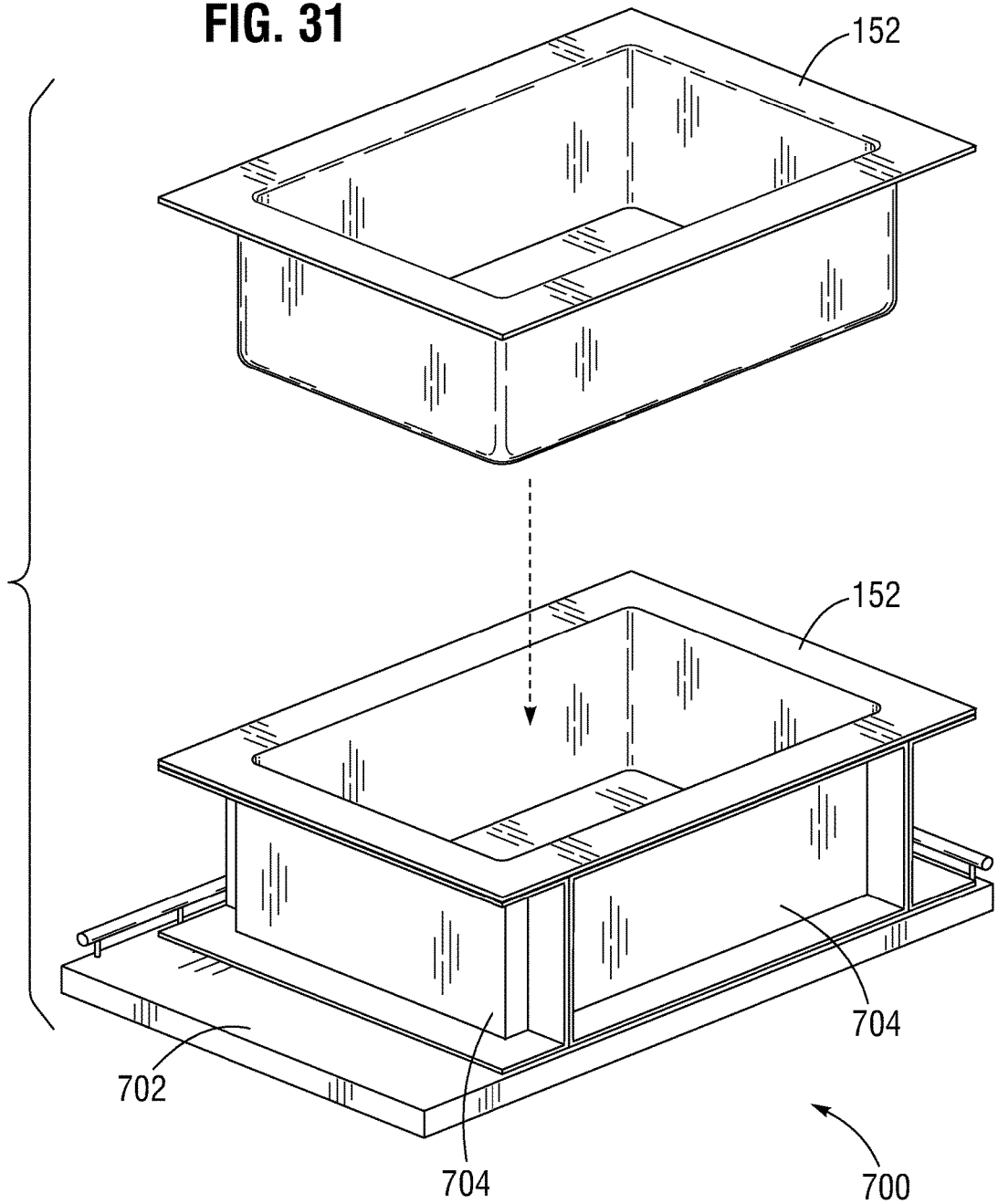

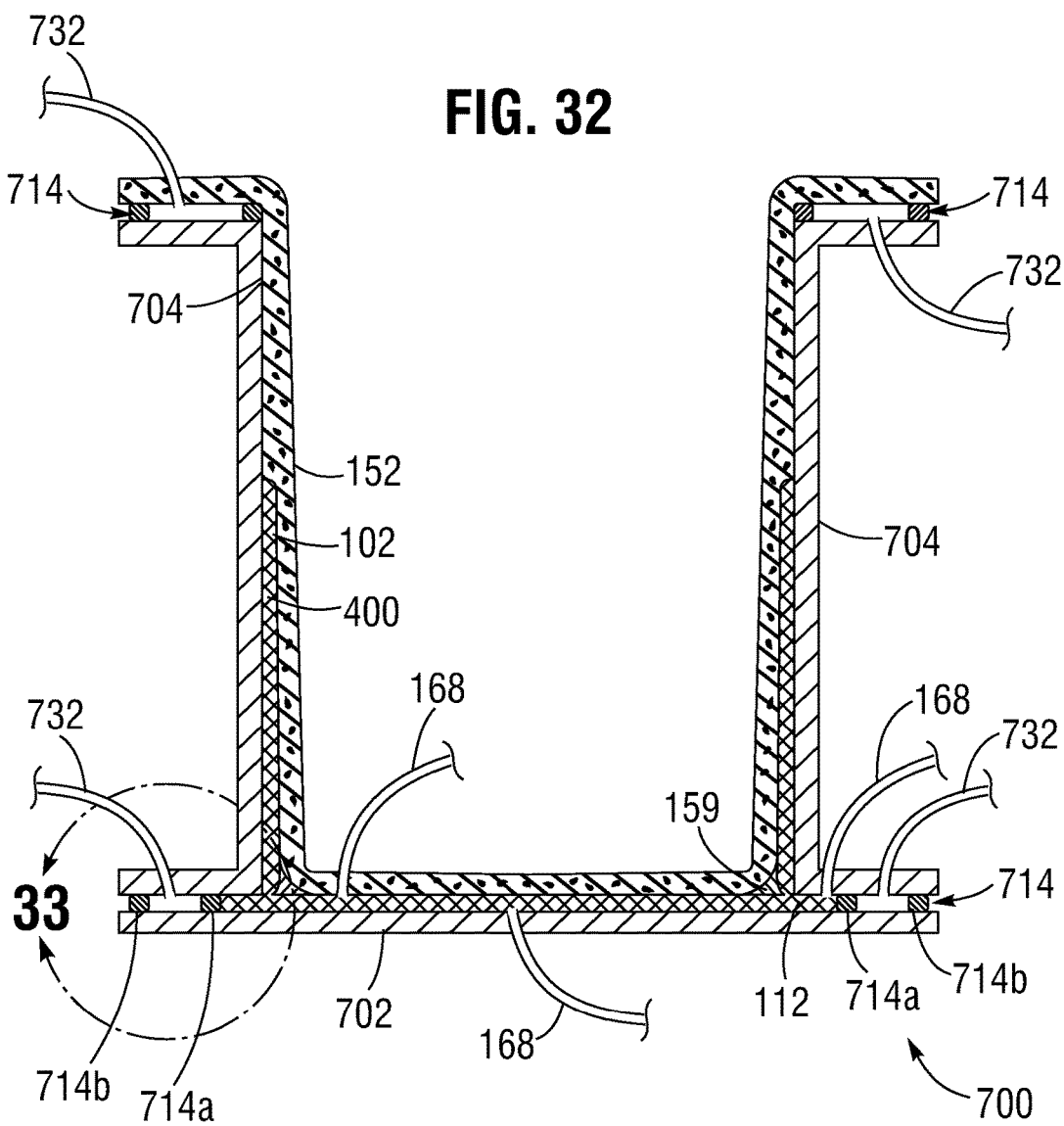
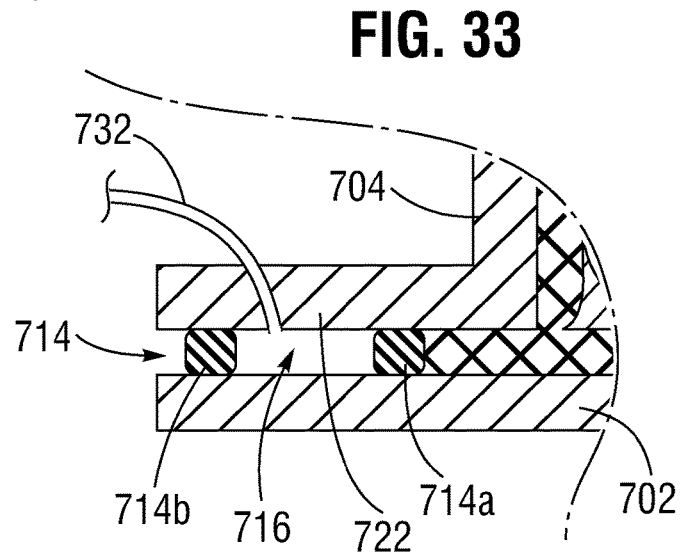

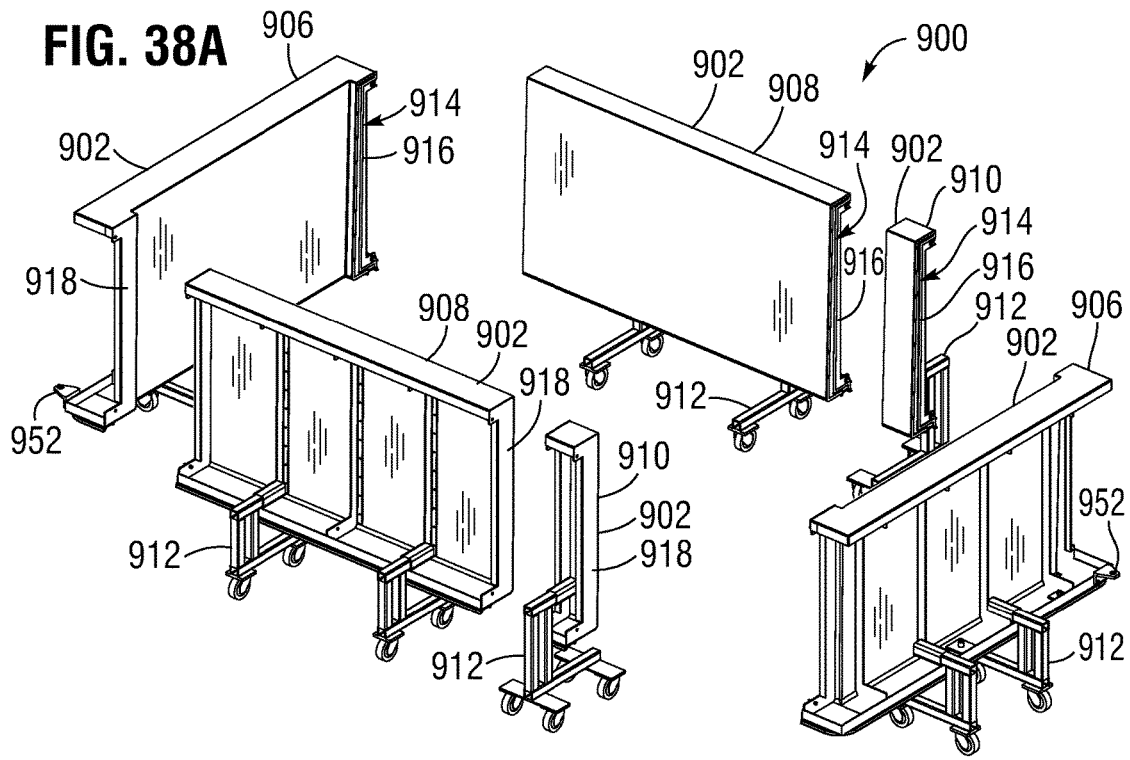
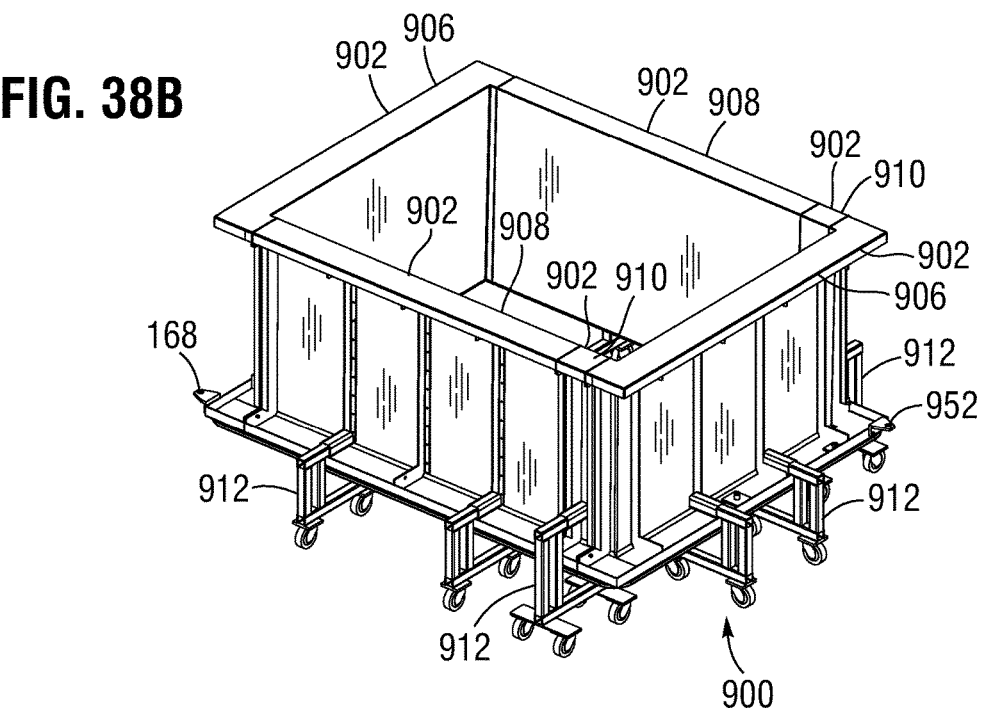

METHOD FOR MANUFACTURING SLIDE-ROOM FOR RECREATIONAL VEHICLE

CROSS REFERENCE TO RELATED APPLICATION

This application claims the benefit of U.S. Provisional Application No. 61/720,315, filed Oct. 30, 2012, which is herein incorporated by reference in its entirety.

FIELD

The present application pertains to embodiments of a slide-room for a recreation vehicle, and methods for manufacturing a slide-room.

BACKGROUND

Generally speaking, a recreational vehicle is any type of vehicle that has a living space, such as a kitchen, bathroom, sleeping area, etc. Recreational vehicles typically are classified in one of two different categories—motorhomes and towables. Motorhomes have an engine and integral driver compartment and therefore can be driven under their own power, while a towable must be coupled to and towed behind a driven vehicle for travelling from place to place.

A variety of recreational vehicles, including motorhomes and towables, are known that have a room or room portion that can be moved from a retracted position while the vehicle is being driven to an extended position when the vehicle is stationary to provide additional internal space. Such expandable rooms are commonly referred to as slide-rooms, slide-outs, slide-houses, slide-boxes, and tip-outs. A slide-room usually includes a floor, a roof, an external end wall (also referred to as a "face" or "face wall") (typically generally parallel to the vehicle side wall), an open (or openable) interior end wall, and one or more side walls (typically generally perpendicular to the vehicle side wall). These components are typically made of frame members and wall panels. In the retracted position, the roof, floor and side walls are typically concealed from exterior view and the room exterior end wall forms a portion of the vehicle side wall.

Various mechanisms are known for moving a slide-room between its expanded and retracted positions. A slide-room typically has an electric motor operatively coupled to a set of gears, cables, chains, and/or hydraulic arms configured to move the slide-room from its retracted position to its expanded position, and vice versa. A slide-room typically slides on a low-friction surface, such as UHMW, or if the slide-room is particularly heavy, it can ride on a set of rollers as it moves between its expanded and retracted positions.

Referring to FIG. 1A, the traditional method of constructing a slide-room includes separately forming the five main components (also referred to as panels) of the slide-room (the end wall 10, two side walls 12, the floor 14, and the roof 16). Thereafter, the main components are secured to each other using mechanical fasteners such as bolts and screws to form a box-like structure as depicted in FIG. 1B. Each main panel typically comprises an outer skin formed from fiberglass or aluminum, an insulating layer (e.g., Styrofoam) glued to the outer skin, and an inner layer of plywood glued to the insulating layer opposite the outer skin. Embedded within the insulating layer are aluminum or steel reinforcing members that receive the bolts or other fasteners used for securing the main panels to each other.

After the box is assembled, exterior flanges 18, usually formed from extruded aluminum, are screwed or riveted around the outside edge of the slide-room, as depicted in FIGS. 2A and 2B. Brackets or channeling 20 typically are secured to the outer corners formed by the intersection of the side walls with the floor and the ceiling, as depicted in FIG. 2C. FIG. 3A shows a prior art exterior flange in the form of a T-shaped bracket 22 that is secured to the outside edge of a slide-room. FIG. 3B shows another prior art exterior flange in the form of an L-shaped bracket 26 that mounts behind skin portion 28 and capped off with U-shaped channel member 30. Skin portion 28 is part of end wall 10 that extends beyond side wall 12. After all of the components of the slide-room are assembled, the joints between all adjoining components must be carefully caulked with a sealant to minimize leakage.

In a typical prior art slide-room configuration, the vehicle body is formed with a main opening sized to receive the side walls 12, floor 14 and roof 16 of the slide-room, and an optionally a recessed portion surrounding the main opening for receiving the exterior flange to form what is referred to as a flush-mounted slide-room. FIG. 4, for example, schematically shows the installation of a slide-room having the flange configuration shown in FIG. 3A. FIG. 4 shows a vehicle body 50 having a main opening 52, and an exterior surface 54 surrounding the main opening. As shown, the body of the slide-room extends inwardly through the main opening 52 and the exterior flange 22 is positioned to contact the exterior surface 54 when the slide-room is in its retracted position. FIG. 5 shows the installation of a slide-room having the flange configuration shown in FIG. 3B. In this installation, the vehicle body 50 has a recessed portion 56 surrounding the main opening 52. The flange (formed by skin portion 28, bracket 26, and channel member 30) is received in the recessed portion 56 when the slide-room is in its retracted position. During assembly and installation of the slide-room, the channel member 30 is adjusted to minimize the gap g between the edge of the flange and the side surface 58 of the recessed portion 56.

The prior art slide-room configurations suffer from many disadvantages. A major problem of known slide-room configurations is that they are extremely susceptible to water leakage through the joints between adjacent panel members that form the slide room and through the spaces between the slide-room and the vehicle opening. Warranty costs of RV manufacturers to repair water damage caused by faulty slide-room designs can be significant.

In order to minimize leaks in the area between the slide-room and the vehicle opening, manufactures have provided a sweeper seal around the edge of the vehicle opening to sweep off water on the slide-room as it is retracted into the vehicle. The problem with this technique is that the channel members and/or molding placed along the joints of the slide-room (e.g., channel members 20 in FIG. 2C) create high spots along the outer surface of the slide-room that prevent the sweeper seal from making complete contact with the slide-room. RV manufacturers also place rubber flange seals on the rear surface of the exterior flange 18 to minimize leakage between the exterior flange and the abutting surface of the vehicle when the slide-room is in its retracted position. Unfortunately, the performance of the flange seals is reduced because gaps or surface irregularities along the surface of flange can prevent the flange from making full contact with the seal. Water leakage is such a significant problem within the RV industry that some manufactures provide modified rain gutters along the lower longitudinal edges of the sides of the slide-room to collect rainwater and direct it outwardly through the vehicle opening.

Another significant problem of known slide-room configurations is that conventional techniques for molding the individual walls that make up the slide-room introduce significant manufacturing variances between different components. As a result, it is often difficult to assemble a slide-room that is completely plumb and fits easily into the vehicle opening. To address this problem, RV manufacturers typically oversize the vehicle opening 52 and recessed area 56 (FIG. 4) to allow the slide-room to be installed in the vehicle. Unfortunately, this introduces additional paths for water to leak into the vehicle and detracts from the overall aesthetics of the vehicle because there is an obvious gap between the face of the slide-room and the adjacent surrounding surface of the vehicle.

As can be appreciated, there exists a strong need for a new and improved slide-room and methods for its manufacture.

SUMMARY

In a representative embodiment, a method for forming a slide-room comprises providing a molding apparatus comprising a plurality of mandrels supported by a base tool and forming an interior compartment, each mandrel having a lower surface spaced above the base tool; clamping the mandrels one to another and each to the base tool; positioning a fiberglass preform in the interior compartment such that a first section of the preform extends along the base tool, an edge portion surrounding the first section extends into any recesses between the base tool and the lower surfaces of the mandrels, and second, third, fourth, and fifth sections of the preform are folded upwardly against adjacent surfaces of respective mandrels; after positioning the preform, positioning an infusion bag in the interior compartment such that a first section of the bag extends parallel to the base tool above the preform and second, third, fourth, and fifth sections of the bag are folded upwardly against the sides and over the tops of adjacent surfaces of respective preform and mandrels, thus forming an infusion space; introducing a resin into the infusion space so that it flows between the infusion bag and mandrels and into the preform; and allowing the resin to cure to form a fiberglass slide-room shell, the slide-room shell having an end wall formed by the first section of the preform, a flange formed by the edge portion of the preform, and a floor, a ceiling, and opposing side walls formed by the second, third, fourth, and fifth sections section of the preform, respectively.

In another representative embodiment, a mandrel for use in molding a composite part comprises a side surface and a lower surface, and the side surface and the lower surface have a common edge. The mandrel also comprises a vacuum seal arrangement located along the lower surface and the side surface of the mandrel. The vacuum seal arrangement defines a bounded area on the side surface and the lower surface that is continuous across the common edge.

In yet another representative embodiment, a molding apparatus for molding composite parts comprises a plurality of mandrels, each mandrel having first and second side surfaces and a lower surface. The mandrels can be arranged such that the first side surface of each respective mandrel opposes the second side surface of the adjacent mandrel. The molding apparatus further comprises a base tool having an upper surface on which the plurality of mandrels are arranged, wherein the mandrels and base tool together define an interior compartment with an opening above. The molding apparatus also comprises a vacuum seal arrangement located along the lower surface and the first side surface of each mandrel. The vacuum seal arrangements, the lower surfaces of the mandrels, and the upper surface of the base tool collectively define a continuous vacuum chamber between the lower surfaces of the mandrel and the upper surface of the base tool. The vacuum seal arrangements, the first side surfaces, and the second side surfaces of respective adjacent mandrels also each define a respective vacuum chamber wherever the first and second side surfaces of respective adjacent mandrels are opposed. Finally, the vacuum chamber between the lower surfaces of the mandrels and the upper surface of the base tool is fluidly connected to each of the respective vacuum chambers between opposed side surfaces of adjacent mandrels.

In another representative embodiment, a method for forming a fiberglass part comprises positioning a plurality of mandrels on a base tool, each mandrel having a lower surface, and the base tool having an upper surface on which the plurality of mandrels are arranged. The mandrels and base tool can together define an interior compartment with an opening above. The method further comprises positioning a vacuum seal assembly wherever two mandrel surfaces are opposed and wherever a mandrel surface is supported by the base tool, wherein all of the vacuum seal assemblies are in fluid communication with each other. The method further comprises positioning a fiberglass preform in the interior compartment, positioning an infusion bag in the interior compartment over the fiberglass preform, introducing a resin into the mold so that it flows over and through the preform, and allowing the resin to cure to form a fiberglass part.

The foregoing and other features and advantages of the invention will become more apparent from the following detailed description, which proceeds with reference to the accompanying figures.

BRIEF DESCRIPTION OF THE DRAWINGS

FIGS. 1A-1B and 2A-2C illustrate a prior art technique for constructing a slide-room for a vehicle.

FIG. 6 is an exploded view of a slide-room for a vehicle, according to one embodiment.

FIG. 7 is a perspective view of the slide-room shown in FIG. 6.

FIG. 8 is an enlarged side view of a portion of an interior panel of the slide-room of FIG. 6.

FIG. 9 is a side view of a vehicle and two different size slide-rooms of the type shown in FIG. 6 installed in the vehicle.

FIG. 19 is a perspective view of a fiberglass preform that can be used to form a slide-room shell in the molding apparatus shown in FIG. 12.

FIG. 20 is a side elevation view of the preform of FIG. 19 viewed along line 20-20.

FIG. 22 is a perspective view of a mold and a preform loading apparatus that can be used to load a preform into the mold, shown with the movable preform support in an extended position.

FIG. 23 is a perspective view of the mold and the preform loading apparatus of FIG. 22, shown with the movable preform support in a retracted position.

FIG. 24 is a side elevation of the mold and the preform loading apparatus of FIG. 22, showing the movable preform support extending into the mold.

FIG. 25 is a side elevation view similar to FIG. 24, but showing the movable preform support retracted after a preform has been loaded in the mold.

FIG. 29A is a perspective, exploded view of the mandrels of a molding apparatus, according to another embodiment, that can be used to form the shell of a slide-room.

FIG. 29B is a perspective view of the mandrels supported on a base tool.

FIG. 30 is a perspective view of the base tool of FIG. 29B.

FIG. 31 is a perspective view of an infusion bag being inserted into the molding apparatus of FIG. 29.

FIG. 32 is a cross-sectional view of the mold assembly of FIG. 30.

FIG. 33 is an enlarged view of a section of FIG. 32 showing a perimeter vacuum chamber.

FIG. 38A is a perspective, exploded view of the mandrels of a molding apparatus, according to another embodiment, that can be used to form the shell of a slide-room.

FIG. 38B is a perspective view of the mandrels of FIG. 39A assembled together.

DETAILED DESCRIPTION

Figure 3A:
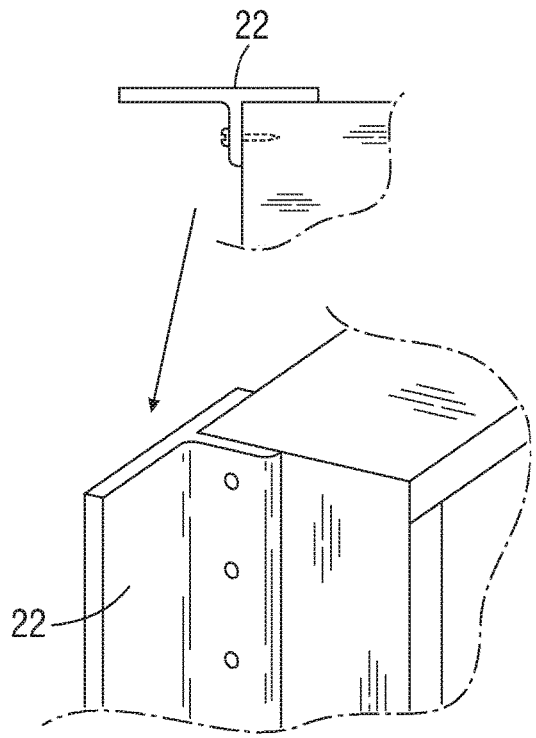
FIGS. 3A and 3B illustrate two different types of prior art exterior flanges used in the construction of slide-rooms.

As used in this application and in the claims, the singular forms "a," "an," and "the" include the plural forms unless the context clearly dictates otherwise. Additionally, the term "includes" means "comprises." Further, the terms "coupled" and "associated" generally means electrically, electromagnetically, and/or physically (e.g., mechanically or chemically) coupled or linked and does not exclude the presence of intermediate elements between the coupled or associated items.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

The present disclosure concerns embodiments of a slide-room for a vehicle and methods for manufacturing the same. FIGS. 6 and 7 are exploded and perspective views, respectively, of a slide-room 100, according to one embodiment. The slide-room 100 comprises a shell, or main body, 102, which has a floor 104, a ceiling 106, opposing side walls 108, and an end wall 110 (also referred to as the face or face wall of the slide room). The shell 102 has an open end opposite the end wall 110 which provides access to the living space inside of the slide-room 100. The shell 102 also has an integral flange 112 surrounding the outer edge of the end wall. The shell 102 desirably has a one-piece, unitary construction, meaning that the floor 104, ceiling 106, side walls 108, end wall 110, and flange 112 are formed without any fasteners, welds, or adhesives securing the various components to each other. As explained in detailed below, all of these components of the shell 102 can be formed at the same time in a mold. In particular embodiments, the shell is constructed from fiberglass, which is a composite material formed from glass fiber matting and a resin. In other embodiments, the shell can be constructed from other types of composite materials formed from a suitable matrix material and a reinforcement material, such as carbon fibers.

In the illustrated embodiment, the flange 112 extends around the entire extent of the end wall 110. In other embodiments, however, the flange 112 can extend less than around the entire extent of the end wall 110. For example, in one implementation, the flange 112 can extend from end wall 110 at the corners of the end wall and the ceiling and the side walls, but does not extend from the corner of the end wall and the floor.

Each of the floor 104, ceiling 106, side walls 108, and end wall 110 can have a respective interior panel 114 secured thereto (for clarity, FIG. 6 does not show the interior panel 114 that is secured to the interior surface of the end wall 110). Each interior panel 114 can be adhesively secured to a respective inner surface of the shell using a suitable adhesive such as a urethane adhesive. As explained in greater detail below, all of the interior panels 114 can be secured to the shell 102 at the same time in a vacuum bonding process. As shown in FIG. 8, an interior panel 114 can comprise an insulation layer 116 and a skin 118 adhesively secured to the insulation layer with a suitable adhesive such as a urethane adhesive. The insulation layer 116 can comprise, for example, polystyrene or other suitable materials known in the art.

The skin 118 can include one or more layers of material, such as a protective layer of plywood secured to the insulation layer and a decorative layer secured to the protective layer forming the inner surface of the slide-room.

A vehicle can have one or more slide-rooms of the same size and shape or different sizes and/or shapes. As used herein, the term "vehicle" refers generally to any vehicle that has a power source (e.g., motor or engine) or a towable vehicle that is coupled to a driven vehicle for travelling from place to place. A vehicle can include, without limitation, a folding camping trailer, a truck camper, a conventional travel trailer, a fifth wheel travel trailer, a sport utility recreational vehicle, a motorhome (e.g., class A, B, and C motorhomes), a horse trailer, a military trailer, or a utility trailer, to name a few. The embodiments of slide-rooms disclosed herein can also be installed in less mobile structures that have limited space, such as mobile homes, house boats, mobile offices or command centers. If desired, the slide-rooms can also be installed in permanent structures, such as houses, stores, etc. The embodiments of slide-rooms disclosed herein can be used for any purpose once installed in a vehicle (or other structures), such as a galley, kitchen, bedroom, dinette, closet, vanity, bathroom, living room, or bonus room. The slide-room can also be a full wall slide-room.

FIG. 9, for example, shows a vehicle 90 having a first, large slide-room 100a and a second, smaller slide room 100b installed in the side wall 120 of the vehicle. As shown in FIG. 11, the vehicle wall 120 includes a main opening 122 that receives the slide-room 100. The slide-room 100 can move relative to the vehicle wall 120 from a retracted position (shown in FIGS. 10B and 11) to an extended position (FIG. 10A), and vice versa, in the directions indicated by double-headed arrow 124. As shown, the flange 112 overlaps the exterior surface of the vehicle wall 120. Consequently, the vehicle wall need not be formed with a recessed portion surrounding the main opening 122 for receiving the flange as in prior art systems. The slide-room 100 can be supported on the vehicle for movement between its retracted and extended positions using conventional techniques and mechanisms.

Figure 10A:
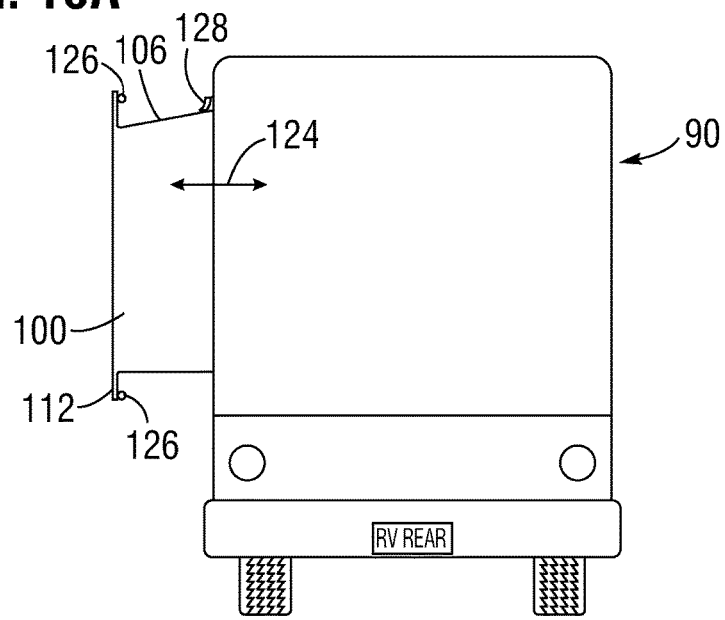
FIGS. 10A and 10B are end views of a vehicle showing the extended and retracted positions, respectively, of a slide-room of the type shown in FIG. 6.
Figure 11:
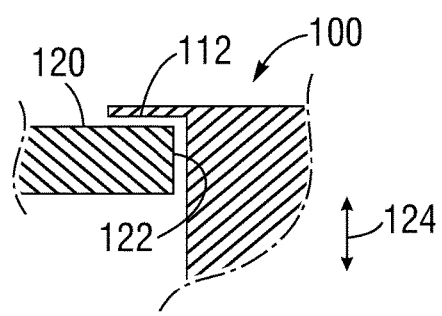
FIG. 11 is an enlarged, cross-sectional view showing a portion of the flange of a slide-room overlapping the adjacent outer surface of a vehicle.

As shown in FIG. 10A, flange seals 126 can be placed on the rear surface of the flange 112 to help seal the flange against the outer surface of the vehicle to minimize the ingress of water into the vehicle. A sweeper seal 128 can be mounted to the vehicle just above the ceiling 106 of the slide-room. The sweeper seal 128 functions to remove standing water from the ceiling 106 as the slide-room is retracted into the vehicle.

Figure 10B:
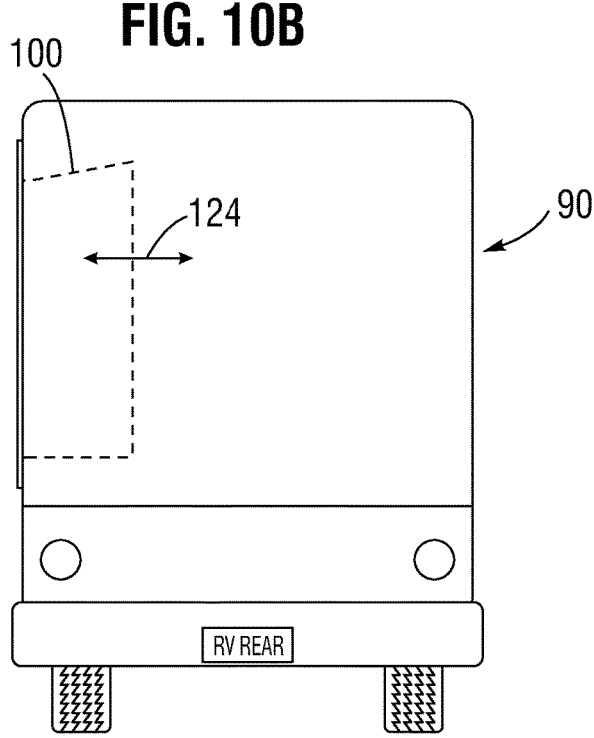

As illustrated in FIGS. 10A and 10B, the ceiling 106 of the slide-room 100 can be non-perpendicular relative to the end wall 110 and can be set at an incline relative to a horizontal plane such that the ceiling slopes downwardly from the open, inside end of the slide-room to the end wall 110. The slope of the ceiling 106 is effective to cause rain water that falls on the ceiling to drain away from vehicle when the slide-room is in its extended position. Alternatively, the ceiling 106 can be parallel to the floor 104 and perpendicular to the end wall 110 and the vehicle side wall 120 (e.g., as shown in the embodiment of FIGS. 6 and 7).

Figure 3B:
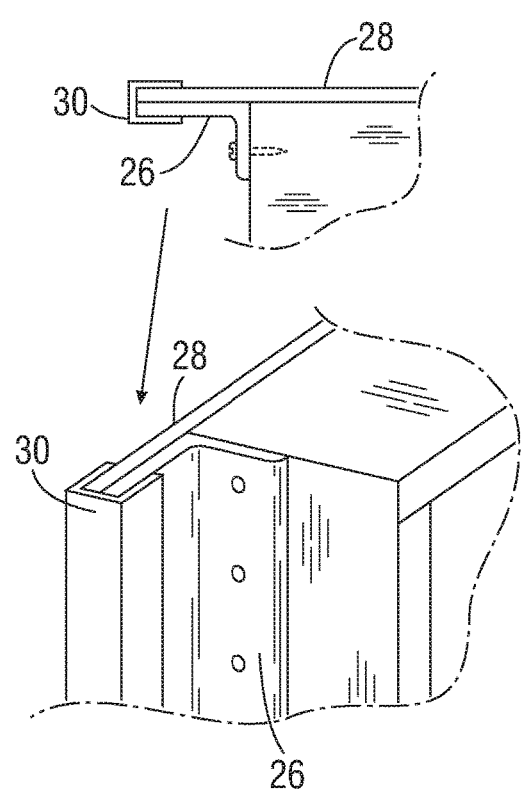
Figure 4:
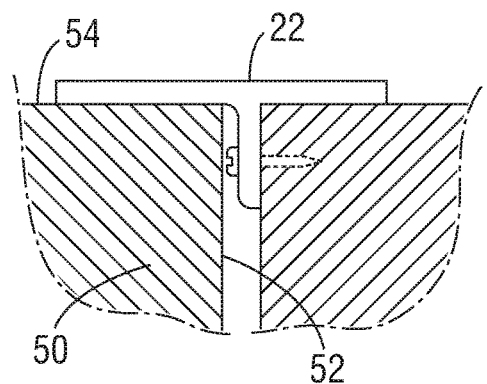
FIG. 4 shows an installed slide-room having the flange construction shown in FIG. 3A.
Figure 5:
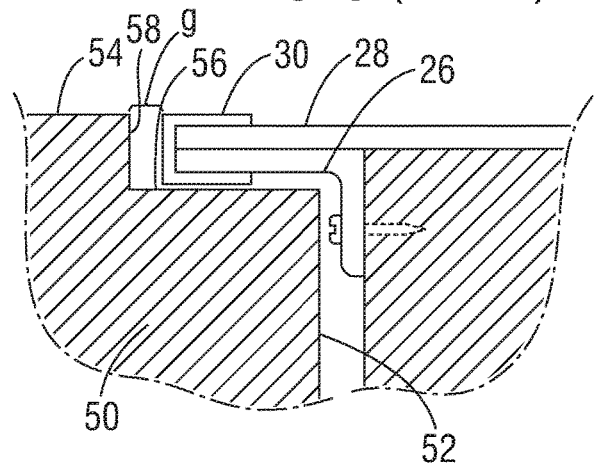
FIG. 5 shows an installed slide-room having the flange construction shown in FIG. 3B.

The illustrated configuration can provide several advantages. For example, the flange 112 can be configured to overlap the vehicle wall around the entire extent of the main opening 122, thereby eliminating any visible gaps between the slide-room and the vehicle wall, which improves the aesthetics of the vehicle. Moreover, since the flange 112 is integrally formed as part of the shell 102, separate components need not be fastened to the shell for forming the flange, as in prior art configurations. The elimination of separate flange components (e.g., flanges 22 of FIG. 3A or flanges 26 of FIG. 3B) reduces material costs and labor associated with installing those components. Advantageously, by eliminating separate flange components, the exterior surface of the slide-room defined by the exterior surfaces of the flange and the end wall 110 can be completely flat and smooth. As a result, the man-hours usually required for detailed work in preparing the vehicle for painting can be significantly reduced. For example, sanding around and taping off the flanges and corner moldings is no longer required. In addition, taping or masking of sections extending across the exterior of the slide-room required for elaborate paint jobs can be accomplished easier and more quickly because the surface irregularities caused by conventional flange components and corner moldings can be eliminated. As can be appreciated, this can result in significant savings in labor costs associated with painting the vehicle. Additionally, because the shell 102 can be formed in one piece, it is much less susceptible to variables in construction, which improves the overall fit and finish of the slide-room, adding better consistency for cabinet installation as well as slide-room installation on the vehicle. Another important advantage of the disclosed slide-room configuration is that it can be provided with improved insulation properties because the amount of metal reinforcing tubing embedded within the slide-room can be greatly reduced or completely eliminated, which in turn increases the overall R-value of the slide-room.

Another significant improvement over the prior art that can be realized by the disclosed slide-room is that water leakage can be greatly reduced by virtue of the one-piece shell design that eliminates leak paths between the walls of the slide-room. In addition, a conventional sweeper seal can be much more effective in removing standing water when used with the disclosed slide-room because surface irregularities that prevent the seal from contacting the outer surface of the slide-room, such as conventional molding and channel members on the outer surface of the slide-room, can be minimized or completely eliminated. Leakage prevention is further improved because the integrally molded flange 112 can improve the performance of the flange seal 126 because the flange can provide a smooth and continuous outer surface that can make full contact with the seal.

Figure 12:
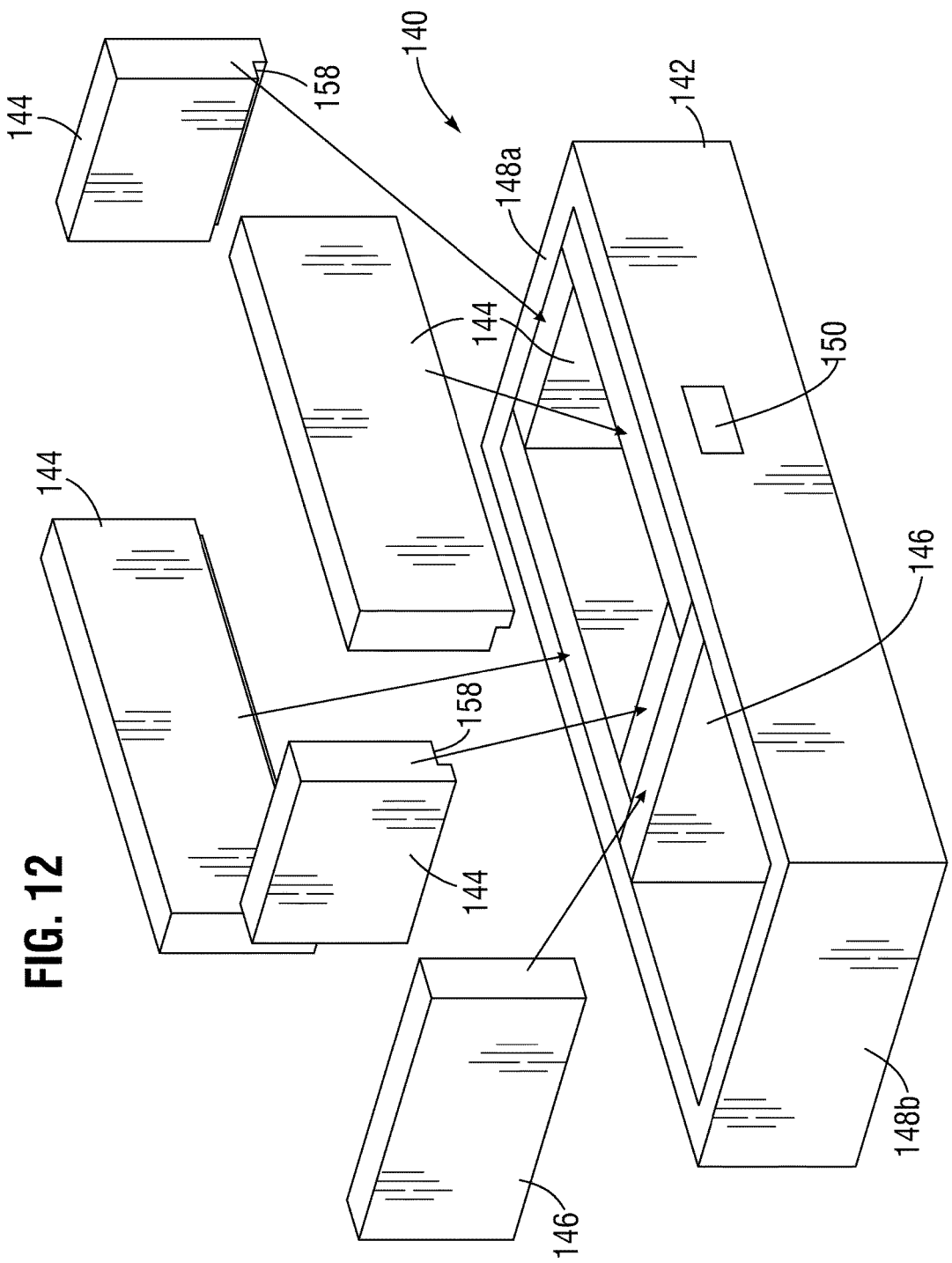
FIG. 12 is a perspective, exploded view of a molding apparatus that can be used to form the shell of a slide-room.

FIG. 12 illustrates a molding assembly or molding apparatus 140, according to one embodiment, that can be used to form the shell 102 of the slide-room. In particular embodiments, the molding apparatus 140 is used for forming a fiberglass shell via a vacuum-assisted resin transfer molding process, also called an infusion molding process. The molding apparatus 140 can include hard tooling such as a base mold 142, one or more mandrels 144, and a spacer 146. The mandrels 144 are configured to form the side walls, floor and ceiling of the shell. Also, the mandrels desirably are configured to be removable from the mold 142. In this manner, the mold can be used with a plurality of different sets of mandrels, each of which can be used to form a shell having a different size and shape.

The spacer 146 also can be removable from the mold and its position along the length of the mold can be adjusted to adjust the effective size of the internal mold cavity that receives the mandrels. For example, the spacer 146 can be moved closer to the opposing end wall 148a of the mold to decrease the length of the mold cavity to form a smaller shell 102. Conversely, the spacer 146 can be moved farther away from the opposing end wall 148a to form a larger shell. In addition, the spacer can be used to separate the mold into two separate mold cavities, each of which can be sized for forming a separate shell. For example, a first mold cavity is defined between the spacer and the end wall 148a and a second mold cavity is defined between the spacer and the other end wall 148b of the mold. A first set of mandrels can be installed in the first mold cavity (as shown in FIG. 12) for forming a first shell and a second set of mandrels (not shown) can be installed in the second mold cavity for forming a second shell. In the forming process described below, the two shells can be formed in the mold at the same time. Traditionally, manufacturers use a different mold for forming each of the various components of the shell. As can be appreciated, the mold apparatus 140 can result in significant cost savings and can significantly reduce overall floor space in a manufacturing facility because a single base mold can be used for forming various shells of different shapes and sizes.

Also, although the illustrated embodiment is described in connection with forming a shell for a slide-room, the molding apparatus 140 can be used to form various other products, such as any of various box-shaped products. Some examples of other products that can be formed using the manufacturing techniques disclosed herein include, without limitation, shipping and storage containers (such as for military, medical, commercial and residential applications), structures or houses for equipment (such as pump or generator houses), hot tubs, swimming pools, watering troughs, planter boxes, utility trailer boxes, spill containers, sheds or components for sheds, slide-rooms for kiosks, duck blinds, boats, canopies, and dock structures.

Once the mandrels 144 and the spacer 146 are installed in the mold, they can be secured in place using suitable techniques or mechanisms. In one implementation, for example, the mandrels 144 and the spacer 146 can be held in place against the inside of the mold with magnets 150 (one of which is shown in FIG. 12) placed against the outside surface of the mold. One type of magnet that can be used for this purpose is a PowerLift® magnet model PNL660.

Figure 13:
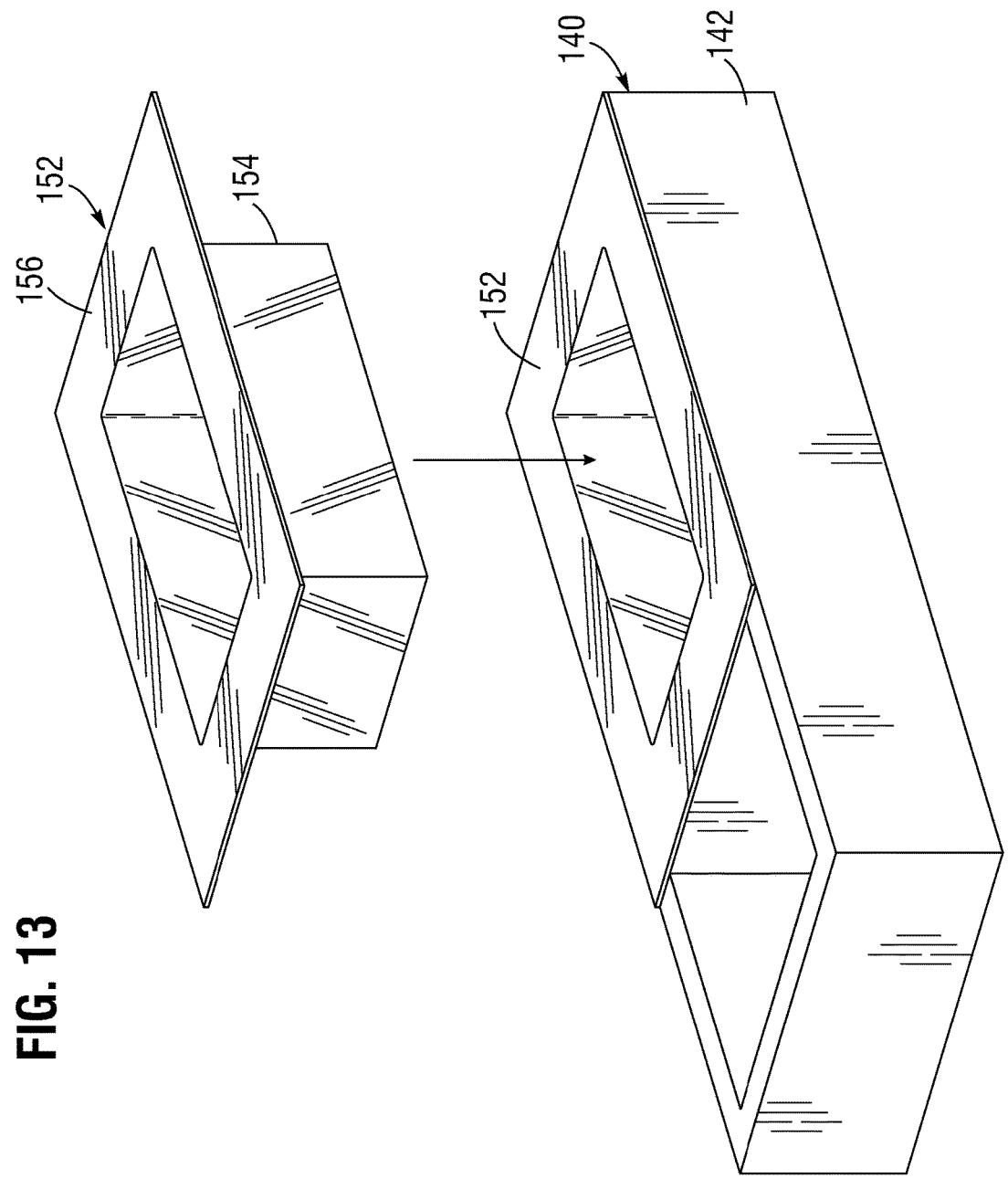
FIG. 13 is a perspective view of the molding apparatus of FIG. 12 showing an infusion bag being installed in the mold for carrying out a vacuum-assisted resin transfer process.

Turning now to FIG. 13, the molding apparatus 140 can further include an infusion bag 152. An infusion bag is also called a vacuum bag. The infusion bag can be used for forming the shell via a vacuum-assisted resin transfer process. The infusion bag 152 has a lower body portion 154 shaped to correspond to the inside surfaces of the mandrels and an upper flange portion 156 that is shaped to rest on top of the mandrels and form a seal with the top of the mandrels to assist in forming a vacuum in the space between the lower body portion 154 and the inner surfaces of the mandrel and the floor of the mold. The infusion bag desirably is formed from natural rubber but suitable synthetic materials, such as nylon, EPDM, silicone, butyl, fluoroelastomers, nitriles, and polyisoprenes also can be used. A method for forming a natural rubber infusion bag is disclosed in U.S. Patent Application Publication No. 2008/0211130, which is incorporated herein by reference. In a working embodiment, the infusion bag was formed using Sprayomer™ elastomer manufactured by SR Composites LLC.

Figure 14:
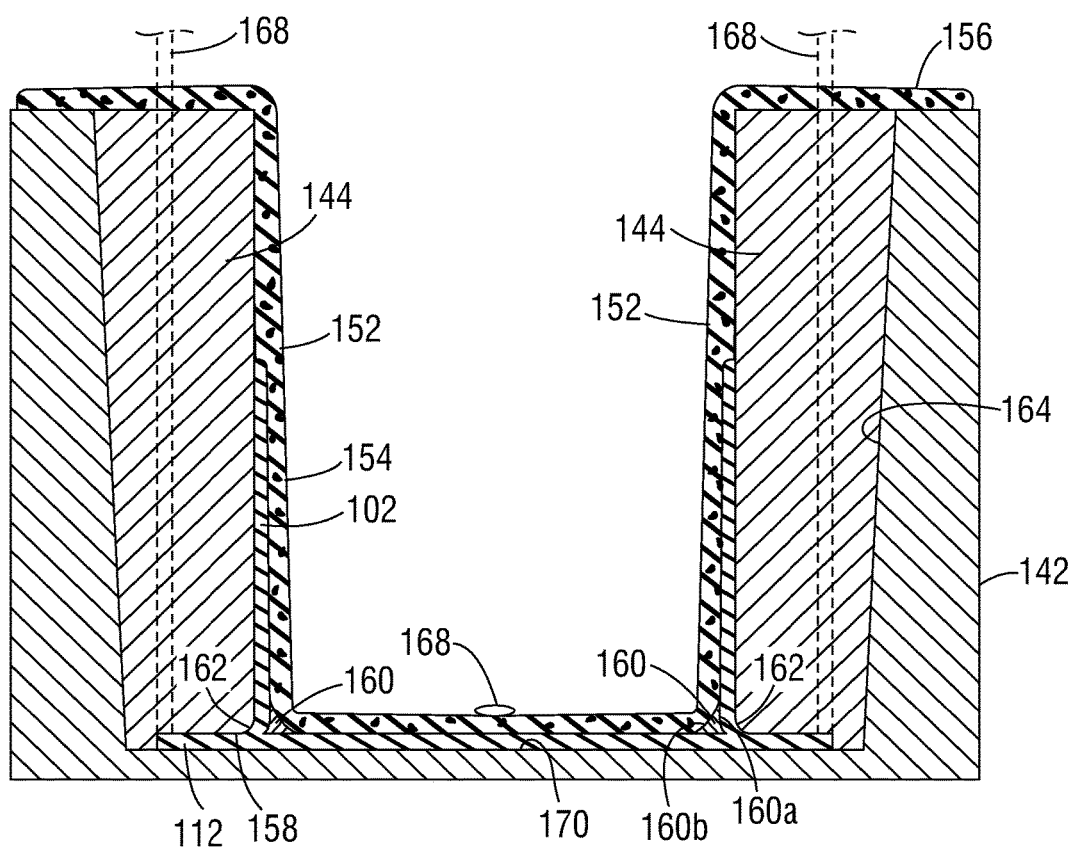
FIG. 14 is a cross-section of the molding apparatus shown in FIG. 13.

FIG. 14 shows a cross-section of the molding apparatus with the mandrels 144 and the infusion bag 152 installed in the base mold 142. For purposes of illustration, a molded shell 102 also is shown. The shell can be formed from a fiberglass preform (one or more layers of fiberglass matting) and a resin that is introduced into the space between the infusion bag and the mandrels. As shown, the inner surfaces of the mandrels are shaped to form the outer surfaces of the side walls, floor, and ceiling of the shell; the floor 170 of the mold is shaped to form the outer surface of the end wall of the shell; and the outer surface of the bag lower portion 154 forms the inner surfaces of the shell. Each mandrel 144 can be formed with a recessed portion 158 at its lower end that creates a small gap between the floor 170 of the mold and the opposing adjacent surface of the mandrel. The gap provides the space required to form the integral flange 112 of the shell. The upright walls of the mold desirably are tapered from the bottom to the top of the mold so as to provide inner side surfaces 164 that extend at an angle offset from perpendicular relative to the floor 170 of the mold. The mandrels can be tapered from top to bottom so as to provide mating outer surfaces that also extend at an angle offset from perpendicular relative to the floor of the mold. The angled surfaces of the mandrels and the mold walls allow the mandrels to be more easily removed from the mold so that the fully formed shell can be removed from the mold after the molding process.

In particular embodiments, inserts 160 (also referred to as caul plates) can be positioned at the bottom of the mold inside the infusion bag to form the inside corners of the shell at the intersection of the shell end wall with the side walls, floor and ceiling of the shell. The inserts 160 desirably are formed from a resilient and/or elastomeric material, such as silicone rubber, but also can be formed from a relatively non-resilient and non-elastomeric material such as metal. The inserts 160 and the opposing lower edges 162 of the mandrels desirably are shaped to form curved sections at the lower ends of the shell side walls, floor, and ceiling where these components meet the end wall of the shell.

Figure 15:
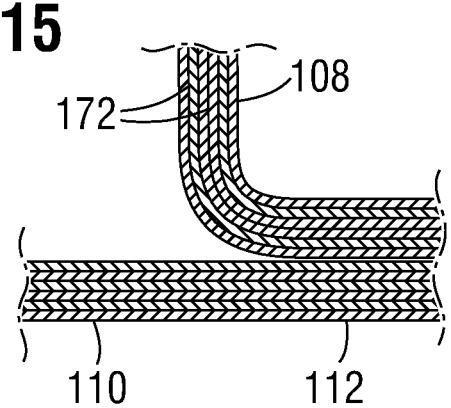
FIG. 15 is an enlarged, cross-sectional view of a portion of a slide-room shell formed in the molding apparatus.

FIG. 15 shows an enlarged, cross-sectional view of a portion of the shell where a side wall 108 intersects the end wall 110 to form the flange 112. As shown, the fiber mats 172 used to form the side wall 108 are curved to form a radiused corner between the side wall 108 and the flange 112. Such curved sections of the shell are advantageous in that they prevent or at least minimize "print-through" of resin on the shell end wall that can occur when the shell expands and contracts due to changes in ambient temperature. In contrast, if the lower ends of the shell side walls, floor, and ceiling form perpendicular corners with the shell end wall 110, then temperature changes can result in print-through of resin in which the resin becomes visible from the outside of shell. The inserts 160 also prevent excess resin from settling at the lower corners of the infusion bag and forming resin rich sections at those portions of the shell, which is an additional cause of resin print-through.

The shell 102 can be formed from composite materials other than fiberglass using the illustrated molding apparatus, including any of various known fiber-reinforced composite materials, such as carbon fiber or Kelvar. A "preform" (discussed below) as used herein refers to the dry fibrous reinforcing material of the composite structure (before a matrix material, such as a resin, is added). The preform can be woven or non-woven, and/or can have continuous or discontinuous/chopped fibers, and/or can have aligned or random-oriented fibers. Any of various known matrix materials can be used in the molding process. Some examples include polyester, vinyl ester, epoxy, phenolic, polyimide, polyamide, polypropylene, PEEK, to name a few. In some embodiments, pre-impregnated lay-ups (fiber sheets pre-impregnated with a resin) can be used to form the shell 102. Moreover, the molding apparatus can be adapted for other molding processes, such as pressure bag molding.

Figure 16:
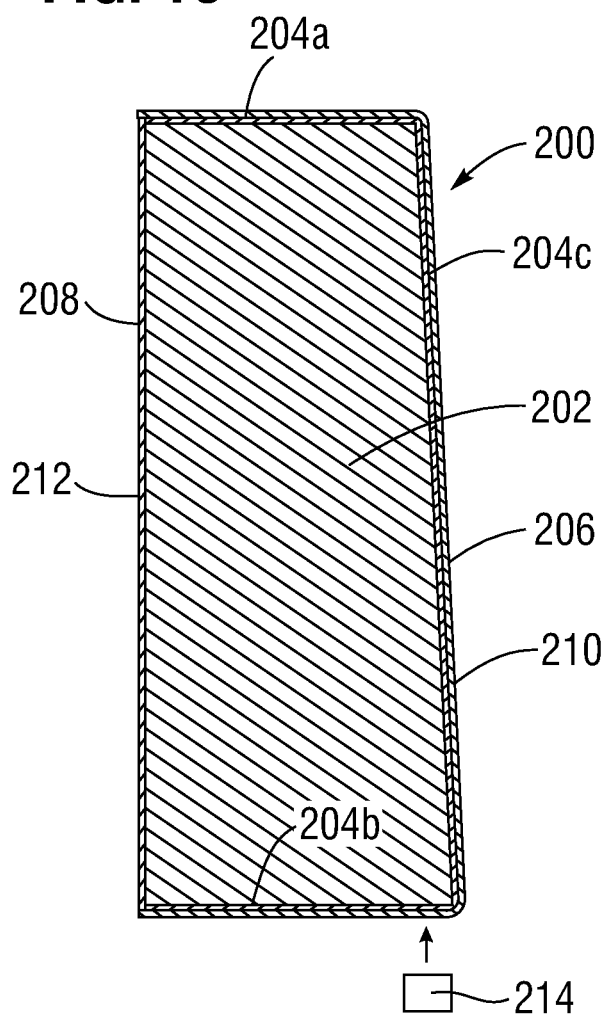
FIG. 16 is a cross-sectional view of a mandrel used in the molding apparatus of FIG. 12.

FIG. 16 is an enlarged cross-sectional view of an exemplary mandrel 200 that can be used with the molding apparatus 140. Mandrels can be any of various shapes and sizes depending on the desired shape of the product that is molded in the molding apparatus 140. The illustrated mandrel 200 comprises an inner core member 202 formed from a relatively rigid, lightweight material, such as a closed cell foam (e.g., polystyrene). The inner core member 202 desirably is covered on the top, bottom and one side by respective plywood panels 204a, 204b, and 204c, respectively. The plywood panels can be covered by a metal outer layer 206 formed from bent sheet metal. The side of the core member 202 opposite plywood panel 204c can be covered by a fiberglass panel 208. The ends of the core member (not shown) also can be covered by respective fiberglass panels (not shown). In use, the mandrel 200 is placed in the mold 142 such that the fiberglass panel 208 abuts the inside surface of the mold 142. The outer surface of the metal skin 206 contacts the part being formed in the mold.

In the embodiment shown in FIG. 16, one side 210 of the mandrel extends at an acute angle relative to the bottom surface of the mandrel. The angled side of the mandrel is effective to form a ceiling 106 of the shell 102 that slopes downwardly away from the vehicle wall when installed in a vehicle (as shown in FIG. 10A). The opposite side 212 of the mandrel can extend at an obtuse acute angle relative to the lower surface of the mandrel to allow for easier de-molding.

As can be seen in FIG. 16, the mandrel 200 is not provided with a recessed portion at its lower end for forming the shell flange 112 like the recessed portion 158 of mandrel 144. Instead, a separate insert 214 can be placed between the bottom surface of the mandrel and the floor of the mold to create a small gap or space that allows the flange 112 to be formed. In other embodiments, the mandrel 200 can be formed with such a recessed portion to eliminate the need for a separate insert 214.

One approach for forming the shell using the molding apparatus 140 is described as follows. First, the mandrels 144 are inserted into the mold, as depicted in FIG. 12. Second, one or more layers of fiberglass matting is positioned along the floor of the mold and the inner side surfaces of the mandrels. The fiberglass matting placed along the floor of the mold (which forms the end wall 110 of the shell) can be sewn or otherwise secured to the matting placed against the inner side surfaces of the mandrels (which form the side walls, ceiling and floor of the shell). Alternatively, the fiberglass matting can be loaded into the mold first, followed by placement of the mandrels into position adjacent the different sections of the fiberglass matting. Positioning of the fiberglass matting can include placing inserts 160 at the lower inside corners of the fiberglass matting, as best shown in FIG. 14.

Figure 21:
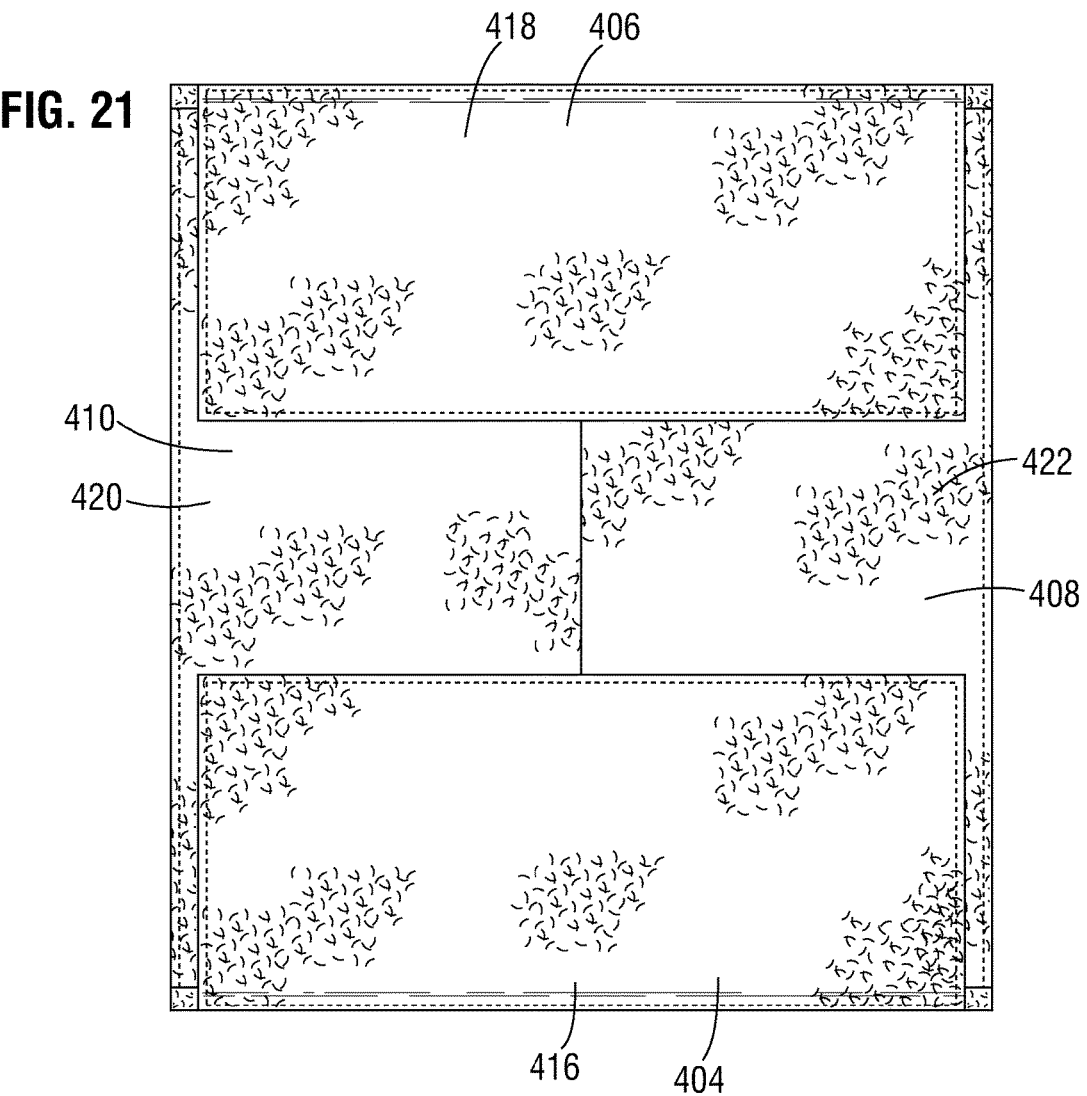
FIG. 21 is a top plan view of the preform of FIG. 19.

FIGS. 19-21 show one example of a fiberglass "preform" 400, which comprises one or more layers of fiberglass matting. The preform 400 can include one or more pre-assembled sections that form the various parts of the shell of the slide-room. The preform 400 in the illustrated embodiment includes a base section 402 (which forms the end wall of the shell), and additional side sections 404, 406, 408, 410 that form the side walls, ceiling and floor of the shell. Each section 402-410 can comprise one or more layers of fiberglass matting (each section comprises two layers of fiberglass matting in the illustrated embodiment). Sections 408, 410 are secured to the base section 402 along stitch lines 412. Sections 404, 406 are secured to the base section 402 along stitch lines 414. Sections 404, 406, 408, 410 are therefore secured to the base section along their respective stitch lines and can be folded upwardly relative to the base section to be placed against the mandrels in the mold.

For example, the preform 400 can be placed on the floor of the mold 142 in the flat configuration shown in FIG. 19. The mandrels 144 can then be placed over the four edges of the preform 400 such that an edge portion of each side of the preform extends below the recessed portion 158 of a respective mandrel. Referring to FIG. 21, a first edge portion 416 of the preform formed by base section 402 and section 404 extends under the recessed portion 158 of a first mandrel; a second edge portion 418 formed by base section 402 and section 406 extends under the recessed portion 158 of a second mandrel; a third edge portion 420 formed by base section 402 and section 410 extends under the recessed portion 158 of a third mandrel; and a fourth edge portion 422 formed by base section 402 and section 408 extends under the recessed portion 158 of a fourth mandrel. After the mandrels 144 are positioned over the edge portions of the preform 400, the individual sections 404, 406, 408, 410 are folded upwardly relative to the base section 402 and held against the inner surfaces of the mandrels, such as by taping the sections of the preform to the mandrels. As can be appreciated, the edge portions 416, 418, 420, 422 underneath the recesses 158 of the mandrels form the integral flange 112 of the shell 102. Thus, each section of the flange 112 is formed by a portion of the base section, and a portion of one of the side sections 404, 406, 408, or 410 that overlays the portion of the base section.

Figure 26:
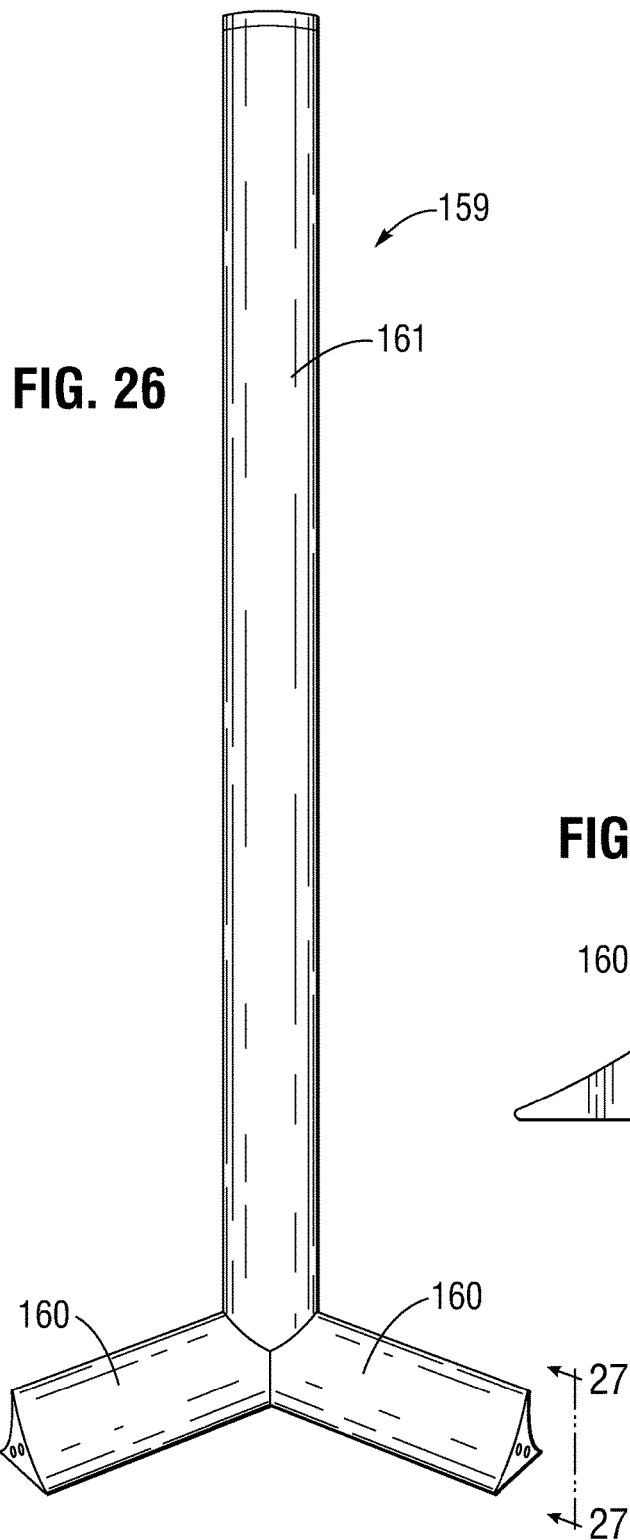
FIG. 26 is a perspective view of a corner caul plate assembly, according to one embodiment.

As noted above, inserts or caul plates can be positioned against the inside corners of the preform 400 to ensure the formation of smooth corners during the resin injection process. FIG. 26 shows a detailed view of a corner caul plate assembly 159 comprising two horizontally disposed caul plates 160 secured to each other at right angles and a vertically upright caul plate 161 extending at right angles relative to the horizontal caul plates 161. The assembly 159 formed by caul plates 160, 161 can be placed against the inside corners of the preform 400 such that each horizontal plate 160 is placed against an inside corner formed by the edge of the base section 402 and the adjacent edge of one of the side sections 404, 406, 408, or 410 (which is folded upwardly relative to the base section). The vertical caul plate 161 is positioned against the vertical inside corner of the preform form by the adjacent vertical edges of two side sections. A respective assembly 159 can be placed at all four corners inside the preform 400.

As shown in FIG. 26, the horizontal plates 160 are relatively shorter than the length of each side of the preform 400. Thus, after four of the caul plate assemblies 159 are placed inside the preform, there can be gaps between the ends of two horizontal caul plates 160 that extend along the same edge of the base section 402. Additional caul plate sections can be placed along the edges of the base section 402 to fill in the gaps between the ends of the horizontal caul plates 160. This technique allows the same corner caul plate assemblies 159 to be used with preforms of different lengths and widths. For example, when a relatively longer or wider preform is used, relatively longer additional caul plate sections will be used to fill in the gaps between the corner caul plate assemblies 159.

Figure 27:
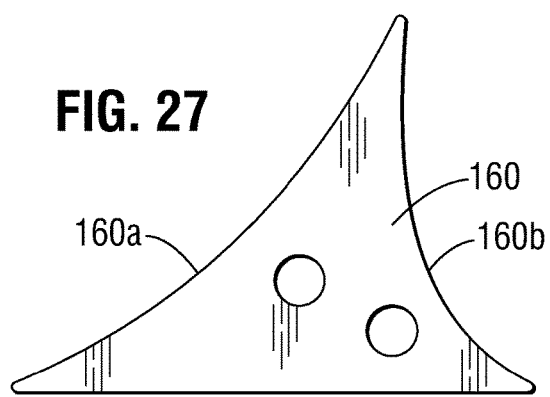
FIG. 27 is an enlarged side elevation view of a caul plate.

As shown in FIGS. 14 and 27, the caul plate 160 has a curved inner face 160a that forms the curvature of the inside corner of the shell 102 between the end wall 110 and each of the floor 104, ceiling 106, and the side walls 108. The caul plate 160 also has an outer curved face 160b that engages the inner surface of the infusion bag 152. The caul plates 160, 161 are shaped to maximize contact with the inner surface of the infusion bag when a vacuum is established inside of the mold in order to prevent or at least minimize the creation of resin rich areas along the corners of the preform.

After the preform, mandrels and caul plates are positioned in the mold, the infusion bag 152 is placed in the mold, as depicted in FIG. 13. The flange portion 156 of the infusion bag forms a seal with the upper surfaces of the mandrels and/or of the upper surface of the mold 142.

After the infusion bag is placed in the mold, a vacuum is created in the space between the infusion bag and the adjacent surfaces of the mandrels and the mold floor, which space is occupied by the fiberglass preform. This space can be referred to as an infusion space. The vacuum can be created by fluidly connecting a vacuum pump to one or more fluid ports 168 used as vacuum ports in the infusion bag and/or the mandrels. As a vacuum is drawn the infusion space, a suitable resin is injected, such as via one or more fluid ports 168 used as injection ports (as shown in FIG. 14). The vacuum causes the resin to flow over and through the fiberglass matting. The bottom of the mold 142 can be heated to facilitate the flow of resin through the space occupied by the fiberglass matting. Thereafter, the resin is allowed to solidify to form the shell 102 of the slide-room.

Figure 17:
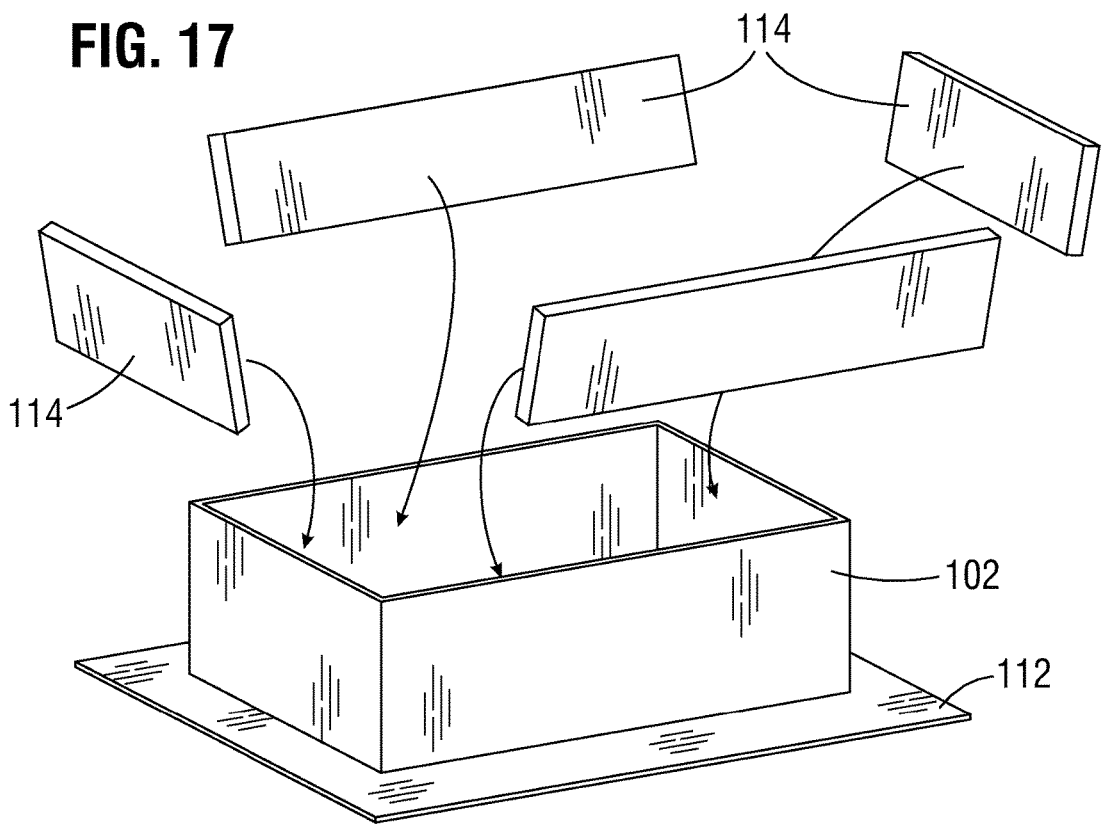
FIG. 17 illustrates the insertion of interior panels into the shell of a slide-room.
Figure 18:
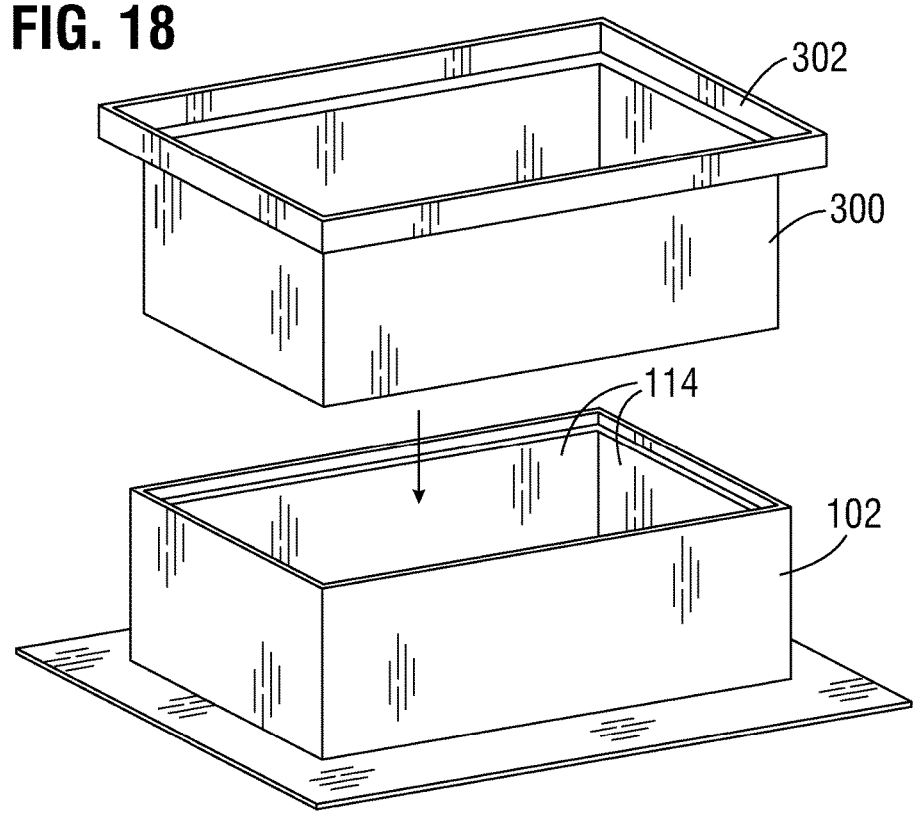
FIG. 18 illustrates the insertion of an infusion bag in the slide-room shown in FIG. 17 to assist in bonding the interior panels to the interior of the shell.

The interior panels 114 of the slide-room can be vacuum bonded to the interior surfaces of the shell 102. For example, FIG. 17 shows the interior panels 114 being placed against respective surfaces inside the shell. An adhesive layer can be formed between the interior panels and the inside surfaces of the shell by placing a suitable adhesive (e.g., urethane adhesive) on the interior panels before they are inserted into the shell. As shown in FIG. 18, an infusion bag 300 can then be placed against the interior panels. An upper flange portion 302 of the infusion bag forms a seal against the inner surfaces of the shell above the interior panels 114. A vacuum can then be drawn on the space below the infusion bag to cause the infusion bag to press outwardly against the interior panels, which facilitates bonding of the interior panels 114 to the shell 102.

FIGS. 22-25 show an apparatus 500 that can be used to assist in loading a preform 400 in the mold 142. The apparatus 500 comprises a preform loader 502 and a preform storage unit 504 mounted on top of the preform loader 502. The preform loader 502 comprises a base 506 and a moveable support, or tray, 508 that is movable relative to the base 506 in a horizontal direction between a retracted position (FIG. 25) and an extended position (FIG. 24). The storage unit 504 stores a plurality of vertically stacked preform supports, or trays 510a, 510b, 510c, 510d, each of which can support a respective preform 400. Each tray 510a-510d can be supported in a horizontal position within the storage unit using conventional mechanisms, such as brackets 512 secured to the inner vertical surfaces of the storage unit, as best shown in FIG. 23. Each tray 510a-510d (and corresponding preform 400) is removable from the storage unit 504 for placement on the moveable support 508 when a preform 400 is ready to be loaded into the mold 142.

For example, when loading a preform into the mold using apparatus 500, the apparatus is moved adjacent to an opening in one side of the mold 142. The opening in the mold 142 can be provided, for example, by removing an end wall or side wall of the mold. The moveable support 508 is then partially extended from the base 502 to allow the lowermost tray 510a (with corresponding preform 400) to be pulled from the storage unit 504 onto the support 508. Referring to FIG. 24, the support 508, the tray 510a and corresponding preform 400 are then moved through the opening in the mold by fully extending the support 508 relative to the base 502. When the preform 400 is in the desired position within the mold, the preform is held in place relative to the floor of the mold (e.g., manually or securing an end of the preform to the floor of the mold) while the support 508 and the tray 510a are retracted out of the mold 142. After the molding process is complete and the cured shell is removed from the mold, another preform 400 in the storage unit 504 (e.g., preform 400 on tray 510b) can be loaded into the mold in the same manner.

Figure 28:
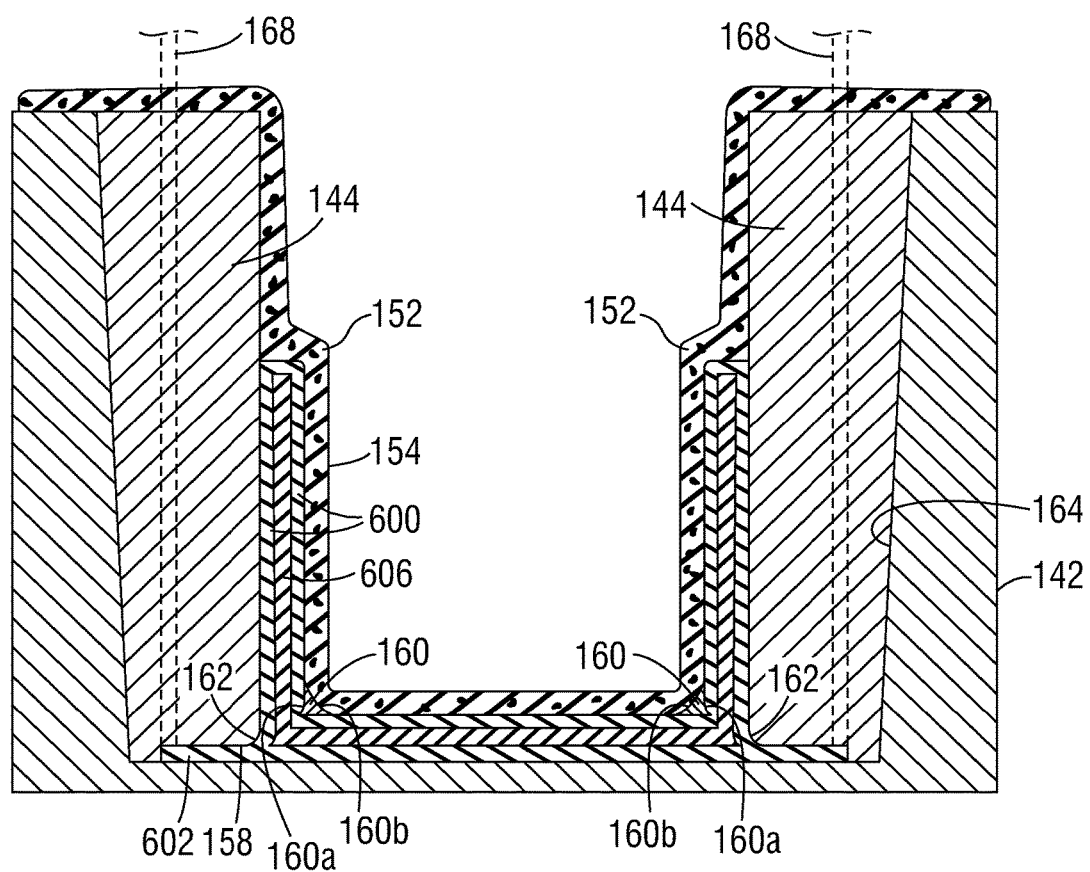
FIG. 28 is a cross-sectional view of a mold assembly being used to form a fiberglass shell that encapsulates an internal core portion.

FIG. 28 shows an example of a "cored" shell 600 being formed in the mold 142. In this embodiment, a preform comprised of multiple sections of fiberglass matting is placed around an inner core 606 (constructed from the same materials that are used to form interior panels 114). The core 606 can comprise multiple sections (e.g., five separate panels like panels 114) or a single unitary structure. In any event, the resin transfer process causes resin to flow over and through the preform, effectively encapsulating the core 606 in the fiberglass shell 600. This process obviates the separate step of bonding individual panels 114 to the inside of the cured shell 102.

Turning to FIGS. 29-35, another embodiment of a molding apparatus 700 will now be described. In the illustrated embodiment, a base mold is not used, although one can be included if desired. Rather, as shown in FIG. 29, the upper surface of a base tool 702 supports one or more mandrels 704. The apparatus 700 can further include guides 706 extending upwardly from the base tool 702 to align the mandrels and a perimeter seal system, as described in detail below. The perimeter seal system comprises one or more seal assemblies or seal arrangements. As used herein, the terms "seal assembly" and "seal arrangement" refer to one or more seals positioned on one or more surfaces of a mandrel. The seal assemblies can be clamp-type or clamp seal assemblies 708 (as shown in FIG. 29B) and/or vacuum-type or vacuum seal assemblies (disclosed below). As used herein, the terms "vacuum seal assembly" and "vacuum seal arrangement" refer to seals that are configured on the surface of the mandrels to create a vacuum chamber between two adjacent mandrel surfaces or between a mandrel surface and an adjacent surface of another component of the molding apparatus (e.g., the upper surface of the base tool) when a vacuum is applied.

FIG. 29A shows an example of four mandrels 704 before assembly. FIG. 29B shows the mandrels 704 assembled together and supported by the base tool 702. When assembled, the mandrels can form an interior compartment of rectangular shape above the base tool 702 with an opening above. Alternatively, interior compartments of other shapes are possible. The mandrels 704 shown are shell-type mandrels or shells, comprising a relatively thin-walled construction. Alternatively, mandrels may be solid or a combination of solid and shell-type. Optionally, mandrels can be reinforced by steel, wood, and/or angle irons.

FIGS. 29A and 29B further show various multisided seals 712, 714 desirably comprising a closed shape, which can be part of a perimeter seal system. The perimeter seal system can include clamp and/or vacuum seal assemblies. These assemblies can be positioned at each surface where one mandrel seals to another mandrel, at each surface where the upper flange of an infusion bag seals to the top of a mandrel, and at each surface where a mandrel is supported by and seals to the base tool. As shown in FIG. 29A, a seal 712 can be disposed between each pair of facing vertical surfaces of adjacent mandrels 704. Also a seal 714 can be positioned on the upper surface of each mandrel 704 so as to seal the flange of an infusion bag with the upper surfaces of the mandrels. Similarly shaped seals 714 can be provided below the lower surface of each mandrel so as to seal the lower surfaces of the mandrel with the upper surface of the base tool 702. Thus, when the mandrels 704 are assembled on the base tool 702 as shown in FIG. 29B, they can be in proximity to and sealed to one another and can be in proximity to and sealed to the base tool 702 by the interposed seals.

The seals 712 between two adjacent mandrels can be positioned near or flush with the edges of the adjacent mandrel faces, particularly those faces toward the interior compartment of the mold. Such positioning reduces the outward flow of resin past the interior mandrel faces. Reducing the flow of resin in this manner leads to a molded part with less or no flashing on portions of the molded part formed near mandrel edges (flashing being excess resin on the edges of a molded part). Reducing or eliminating the amount of flashing therefore requires substantially less rework or sanding or grinding of the molded part to remove the flashing.

When a surface of a mandrel to be sealed is not a simple rectangle, as is the case for the upper surfaces of two of the mandrels shown in FIG. 29A, then a seal 714 can conform to the more complicated shape of that mandrel surface, as is shown in FIG. 29A. Alternatively, seals may be extended across joints between mandrels (not shown), so that simple rectangular closed seals still can suffice to create a complete boundary.

Figure 36:
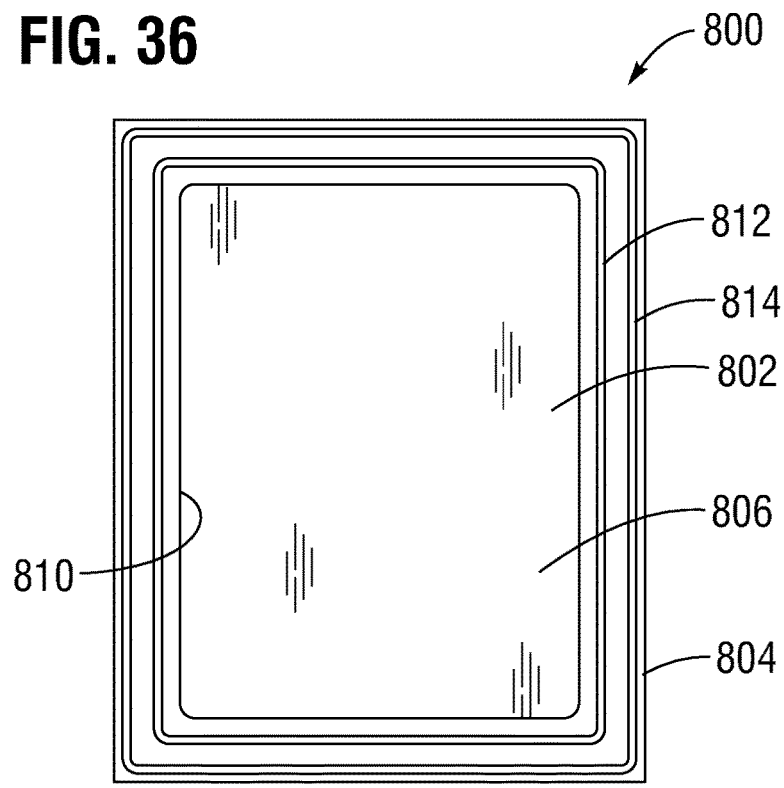
FIG. 36 is a bottom plan view of an infusion bag and seal assembly, according to one embodiment.

As another alternative arrangement of the seals, large concentric seals spanning the entire assembled upper surface of the mandrels can be used (FIG. 36). For example, at the upper surfaces of the assembled mandrels, a first large rectangular closed seal can be positioned to extend along the inner edges of the upper surfaces of the mandrels. A second seal forming a larger rectangle can be positioned on the assembled upper surfaces of the mandrels but outwardly of the first seal. Similarly, a pair of rectangular seals can be positioned beneath the assembled lower surfaces of the mandrels to seal the lower surfaces of the mandrels to the base tool. Using large concentric closed seals in this manner can reduce the number of joints between adjacent seals, through which resin might flow.

As an alternative to closed-loop seals (seals having no ends and a closed shape), linear seals having two opposing ends can be used. A single linear seal may be used in a clamp seal assembly between two mating surfaces, although closed-loop seals can also be used in clamp seal assemblies. A seal having a closed shape is preferred in a vacuum seal assembly to establish a vacuum chamber between two mating components, as described in detail below.

The perimeter seal system can include one or more clamp seal assemblies 708. A clamp seal assembly comprises a seal 712 (or a seal 714) and one or more mechanical clamps 710. A seal 712 can be positioned nearly flush with the inner edges of the mandrels 704 so as to minimize the outward flow of resin into spaces between the mandrels. As shown in FIG. 29B, one or more clamps 710 can be installed on each pair of adjacent side walls 720 to clamp together the side walls 720 with a seal 712 in between. As noted above, one or more seals 714 can be positioned between the lower surface of each mandrel and the base tool. Although not shown, one or more clamps 710 can be used to clamp the lower walls 722 of each mandrel to the base tool. The guides 706 can be used to square the mandrels and base tool relative to each other.

FIG. 29B shows the molding apparatus 700 comprising a base tool 702 and one set of four mandrels 704. While not shown, a base tool alternatively can be sized to support two or more separate sets of mandrels, thus allowing a molding apparatus to mold more than one part simultaneously.

FIG. 30 shows the base tool 702 in isolation. The base tool can comprise a flat upper surface, sized to support and align mandrels. The illustrated base tool includes two guides 706, shown as rails. Guides can comprise rails as shown, and/or guides can comprise pins at the edge of and extending upwardly from the upper surface of the base tool. Preferably two or more guides ensure the mandrels remain square. In alternative embodiments, guides 706 can be positioned at all four sides of the upper surface of the base tool. The upper surface of a base tool may be heated to facilitate sealing and/or molding.

FIG. 31 shows an example of an infusion bag 152 as part of the molding apparatus 700. The infusion bag is shown being inserted into the interior compartment formed by the assembled mandrels 704. The infusion bag can be inserted after a preform 400 (not shown in FIG. 31) is loaded into the apparatus 700.

FIG. 32 shows a cross-section of the molding apparatus 700, including seals 714 positioned above and below the mandrels 704. The seals 714 are parts of respective seal assemblies of the perimeter seal system.

As in previous embodiments, the molding apparatus 700 can be used to form the fiberglass shell 102 of the slide-room 100 using a vacuum-assisted resin transfer molding process. The preform 400 (e.g. a fiberglass preform) can be positioned between the base tool/mandrels 702/704 and the infusion bag 152. Insertion of the infusion bag defines an infusion space between the infusion bag, the interior faces of the mandrels, and the base tool. The preform 400 occupies portions of the infusion space. To enable the molding process, fluid ports 168 used as vacuum ports can draw a vacuum on the infusion space. Additional fluid ports 168 used as injection ports can deliver resin to the same space. As in previous embodiments, one or more fluid ports 168 for the infusion process can pass through the infusion bag 152 and/or the mandrels 704. In the present embodiment, one or more fluid ports 168 can additionally pass through the base tool 702. It should be noted that the fluid ports 168 can be provided in the infusion bag, the base tool, and one or more of the mandrels. Also, any number of fluid ports 168 (e.g. one or more) can be used to establish a vacuum in the infusion space and any number of fluid ports (e.g. one or more) can be used to inject resin into the infusion space.

FIG. 33 is an enlargement of a section of FIG. 32 and shows a vacuum seal assembly comprising a seal 714 and a cross-sectional view of a perimeter vacuum chamber 716 bounded on the bottom by the base tool, bounded on the top by the lower wall 722, and bounded on the sides by the laterally spaced segments or legs 714a, 714b of the seal 714. Any vacuum used in the perimeter seal system is distinct from the vacuum of the infusion molding process. As shown, a vacuum fluid port 732 can be fluidly connected to the vacuum chamber 716 to establish a vacuum in the chamber 716 during the molding process, as further described below.

FIG. 33 also shows the cross-section of the segments 714a, 714b of a seal 714. The cross-section of a seal can be round, triangular, square, square with rounded corners, or other suitable shapes. Seals can comprise a soft or semi-soft material, which is selected to have sufficient elasticity to establish a fluid-tight seal between two surfaces and be firm enough to resist the pressure differential between vacuum and atmospheric pressures, thus closing any paths through which air might be drawn into the mold. The seals can comprise natural rubber, silicone rubber, or any of various synthetic elastomers. These characteristics of a seal can apply to seals used in either clamp seal assemblies or vacuum seal assemblies.

The seals also function to block the flow of resin into joints between opposing surfaces of the mandrels, the base tool, and the infusion bag. As a result, a part can be molded with relatively clean edges and therefore less flashing.

Returning to FIG. 32 and referring to the mandrel 704 shown to the right, the seal 714 is positioned below the mandrel and has a thickness and firmness to position the mandrel a desirable height above the base tool. Also, the inner segment 714a can be spaced outwardly from the lower, inner edge of the mandrel. Thus, the height of the mandrel and lateral positioning of the seal combine to create a volume (functionally similar to the recessed pocket 158 of FIG. 14) to receive an edge of the preform 400 for forming a portion of the flange of the shell 102.

Similarly, the other mandrels 704 can also be supported above the base tool 702 in the same manner to define a space or volume for receiving an edge portion of the preform 400 for forming all four sides of the flange 112. The size and thickness of the flange 112 can be adjusted by changing the distance that seals are spaced outwardly from the lower inner edges of the mandrels and/or by changing the thickness and/or firmness of the seals.

Figure 34:
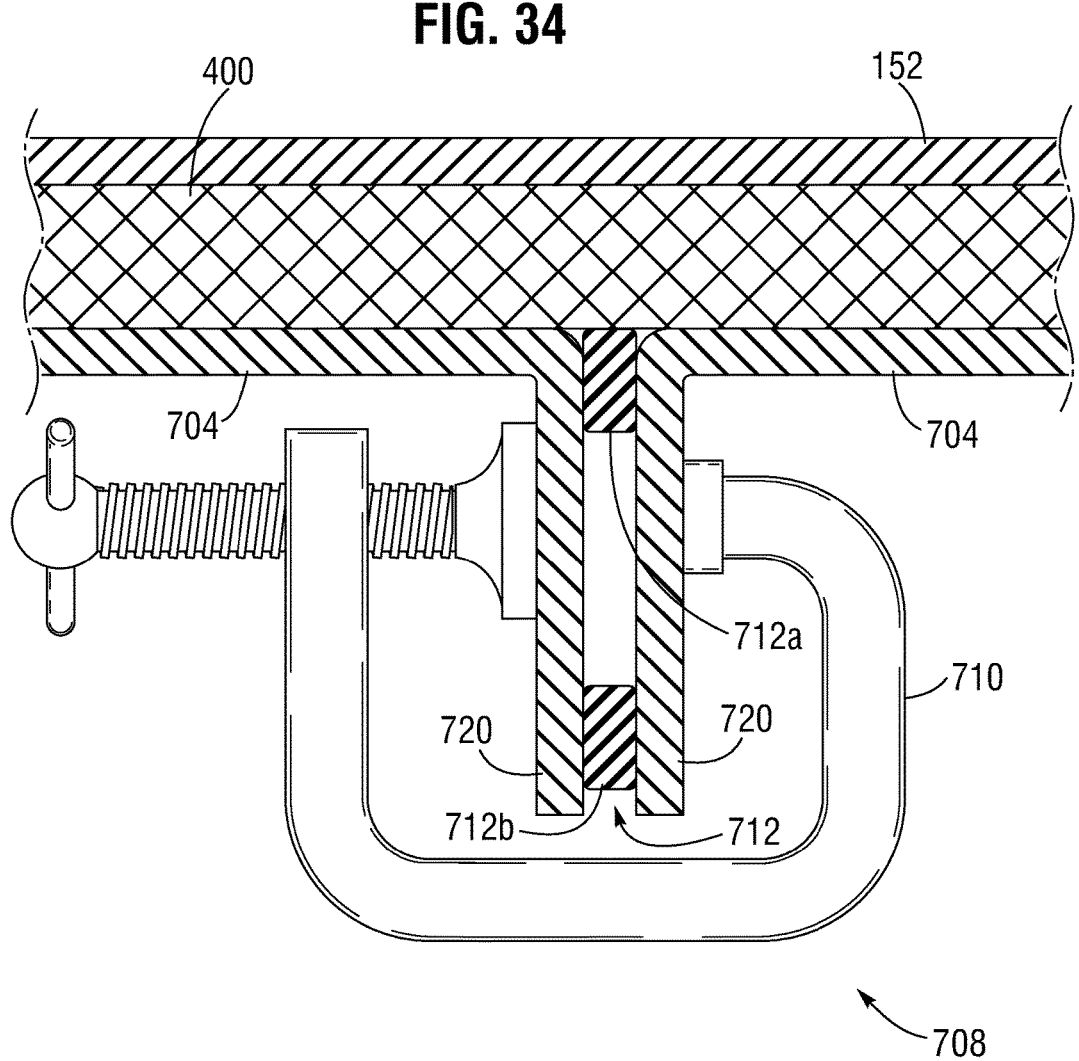
FIG. 34 is a cross-sectional view of a clamp seal assembly.

Turning to FIG. 34, there is shown an example clamp seal assembly 708 as used in the molding apparatus 700 of FIG. 29. The assembly comprises a clamp 710 that applies forces to the opposing side walls 720 of mandrels 704 separated by a seal 712 having two segments 712a, 712b shown in cross-section in FIG. 34. Also shown is a section of a preform 400 between an infusion bag 152 and two mandrels 704. A clamp seal assembly can seal opposing surfaces of adjacent mandrels (or opposing surfaces of a mandrel and the base tool) by clamping a seal firmly enough between the opposing surfaces to close leakage routes through which air might be drawn into the apparatus during molding and to block the flow of resin into the joints between the opposing surfaces.

While not shown, a clamp seal assembly also can be used to establish a fluid-tight seal between a flange of the infusion bag and the top of a mandrel. In that case, a rigid plate may be interposed between the clamp and the infusion bag in order to more evenly distribute clamping forces across the infusion bag and across the seal of the clamp seal assembly.

Figure 35:
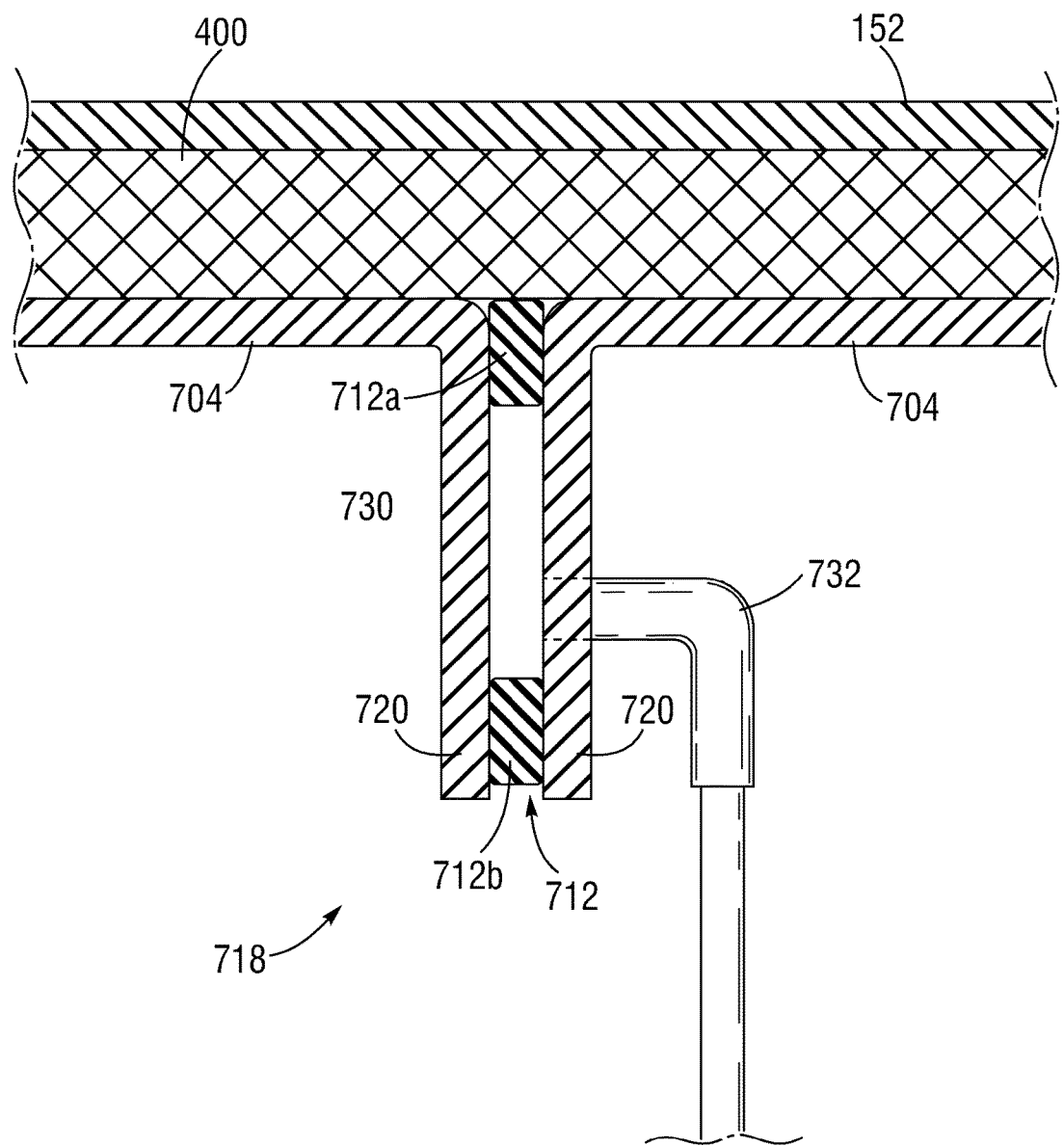
FIG. 35 is a cross-sectional view of a vacuum seal assembly.

FIG. 35 shows an example vacuum seal assembly 718 being used to seal two opposing side walls 720 of adjacent mandrels 704. The lower sections of the mandrel and the base tool are not shown in this view. The vacuum seal assembly 718 comprises a conduit or vacuum line 732 in fluid communication with a vacuum chamber 730 between the side walls 720. The vacuum line 732 can be connected to a port in one of the side walls 720 as shown. Even if a perimeter seal system includes vacuum seal assemblies, clamps also can be used to supplement the vacuum seal assemblies. Thus, clamp seal assemblies 708 and vacuum seal assemblies 718 can be co-located. The clamps can maintain component positions until the perimeter vacuum establishes a vacuum between two components sufficient to maintain component positions and seal the perimeter. Thus, each of the mating surfaces of the molding apparatus 700 (mating surfaces of two mandrels, mating surfaces of a mandrel and the base tool, or mating surfaces of a mandrel and the infusion bag) can be sealed with a clamp seal assembly having one or more mechanical clamps and/or a vacuum seal assembly.

Continuing with FIG. 35, the vacuum seal assembly 718 seals the opposing surfaces of side walls 720 by drawing a vacuum in the perimeter vacuum chamber 730 defined between the opposing surfaces and the spaced apart segments 712a, 712b of seal 712. As shown, the space occupied by the preform 400 (that is, the infusion space) is distinct from the perimeter vacuum chamber 730 (i.e., the vacuum chamber 730 is fluidly sealed from the infusion space in order to establish two levels of vacuum in the chamber 730 and in the infusion space). The vacuum in the perimeter vacuum chamber creates a compressive holding force on the side walls 720 of the mandrels 704 and the seal 712 as a result of a pressure differential between atmospheric pressure outside of the mold assembly and the vacuum inside the chamber 730. Optionally, one or more clamps 710 can be installed on the side walls 720 to apply an additional compressive force to assist in establishing a fluid-tight seal between the side walls and within the vacuum chamber 730.

The perimeter vacuum (i.e., the vacuum in the vacuum chambers of any vacuum seal assemblies) can be regulated to be at slightly greater vacuum than the vacuum used to draw resin into the infusion space, where the preform is located. Such a vacuum differential causes any air leaking in from the exterior to be drawn into the perimeter vacuum chamber and removed before passing into the infusion space. As an example, the perimeter vacuum can be drawn down to a range of between 5 and 30 inches of mercury (Hg) of vacuum, with 29 inches being a preferred value. The pressure in the infusion space can be drawn down to a range of between 5 and 30 inches Hg of vacuum, with 27 inches being a preferred value when the perimeter vacuum is at 29 inches Hg. The perimeter vacuum can be greater than the vacuum applied to the infusion space by between 0.5 and 20 inches Hg. The perimeter vacuum is preferably 2 inches Hg greater than the infusion space vacuum.

The vacuum line 732 of each vacuum seal assembly can be fluidly connected to a main vacuum line, which in turn can be fluidly connected to a common vacuum source, preferably separate from the vacuum source used to establish a vacuum in the infusion space.

Figure 37:
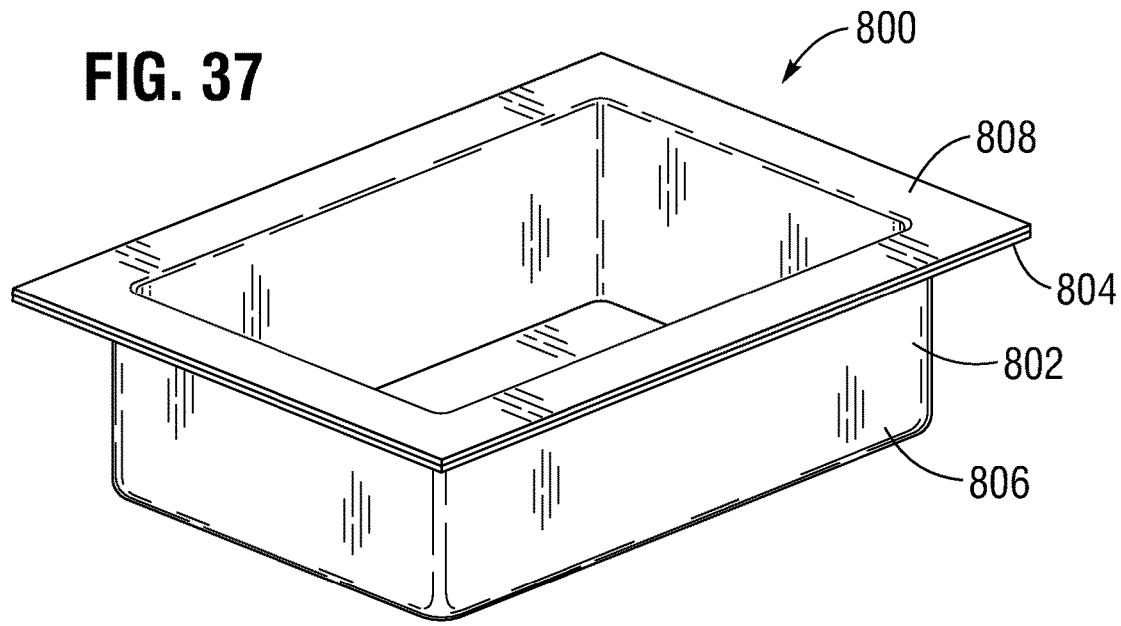
FIG. 37 is a perspective view of the infusion bag and seal assembly of FIG. 36.

Referring now to FIGS. 36-37, there is shown an infusion bag and seal assembly 800, according to one embodiment. The assembly comprises an infusion bag 802 (which can be the same as the infusion bag 152 of FIG. 31) and a support frame 804. The infusion bag 802 comprises a lower body portion 806 and an upper flange 808 extending laterally from the upper edge of the body portion 806. The flange 808 is secured to the upper surface of the frame 804 (e.g., with a suitable adhesive or mechanical connectors) and the lower body portion 806 extends downwardly through a central opening 810 in the frame 804. The frame 804 desirably comprises a material that is relatively more rigid than the infusion bag, such as any suitable metal (e.g., aluminum, etc.) to provide rigidity to the flange 808.

As shown in FIG. 36, which is a bottom plan view of the assembly 800, a first, inner seal 812 and a second, outer seal 814 concentric to the inner seal, are mounted to the lower surface of the frame 804. Thus, in this embodiment, the seals 812, 814 replace the four individual seals 714 (FIGS. 29A and 29B) placed on top of the mandrels 704. In use, the lower body portion 806 of the infusion bag 802 is placed within the cavity of the assembled mandrels 704 and the flange 808 and the support frame 804 are placed on top of the mandrels 704. In this manner, the seals 812, 814 contact the upper surfaces of the mandrels 704. Clamp seal assemblies 708 and/or vacuum seal assemblies 718, as described above, can be used to create a fluid tight seal between the upper surfaces of the mandrels and the support frame 804.

Figure 42:
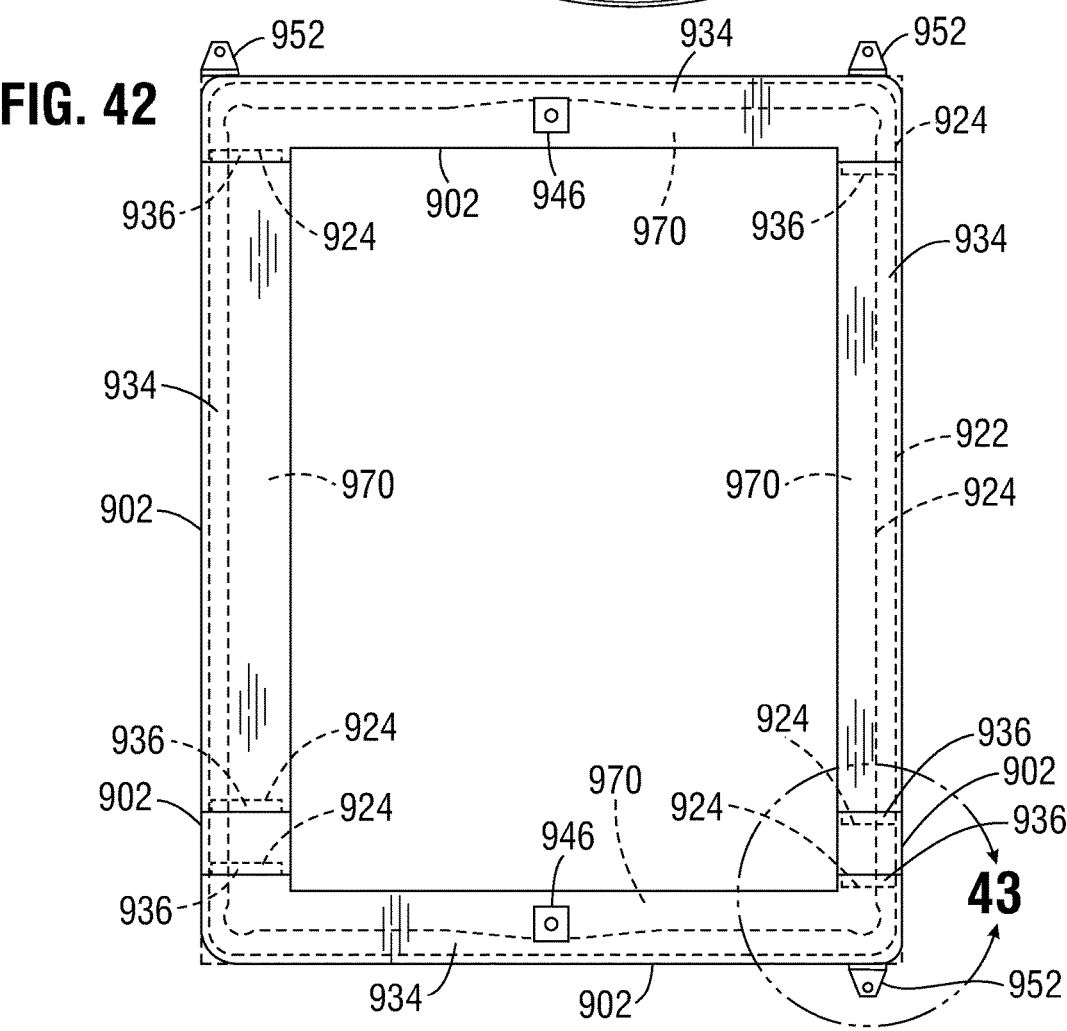
FIG. 42 is a plan view of the assembled molding apparatus of FIG. 38B.
Figure 43:
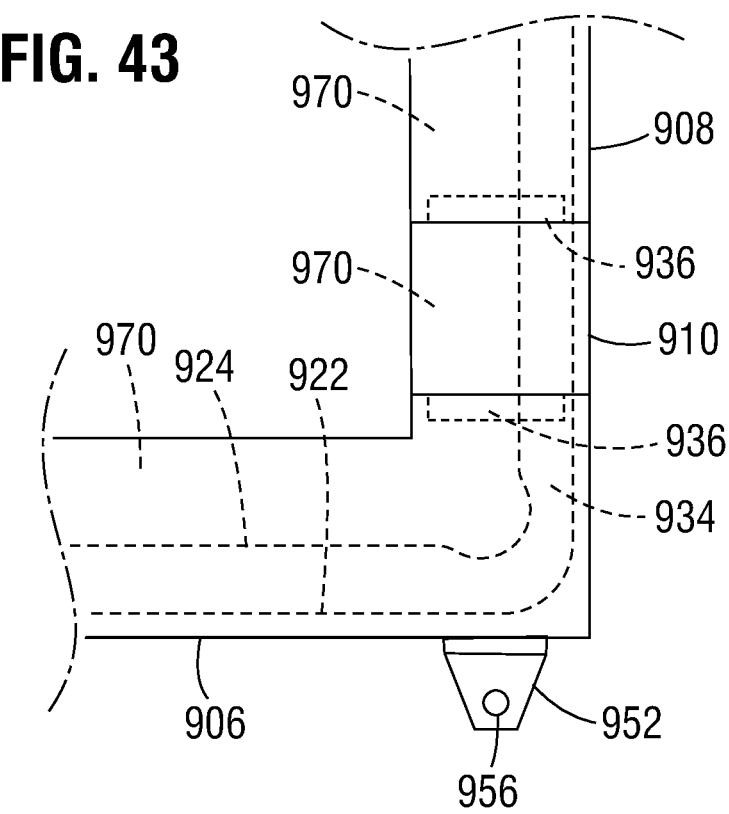
FIG. 43 is an enlarged fragmentary view of FIG. 42.
Figure 44:
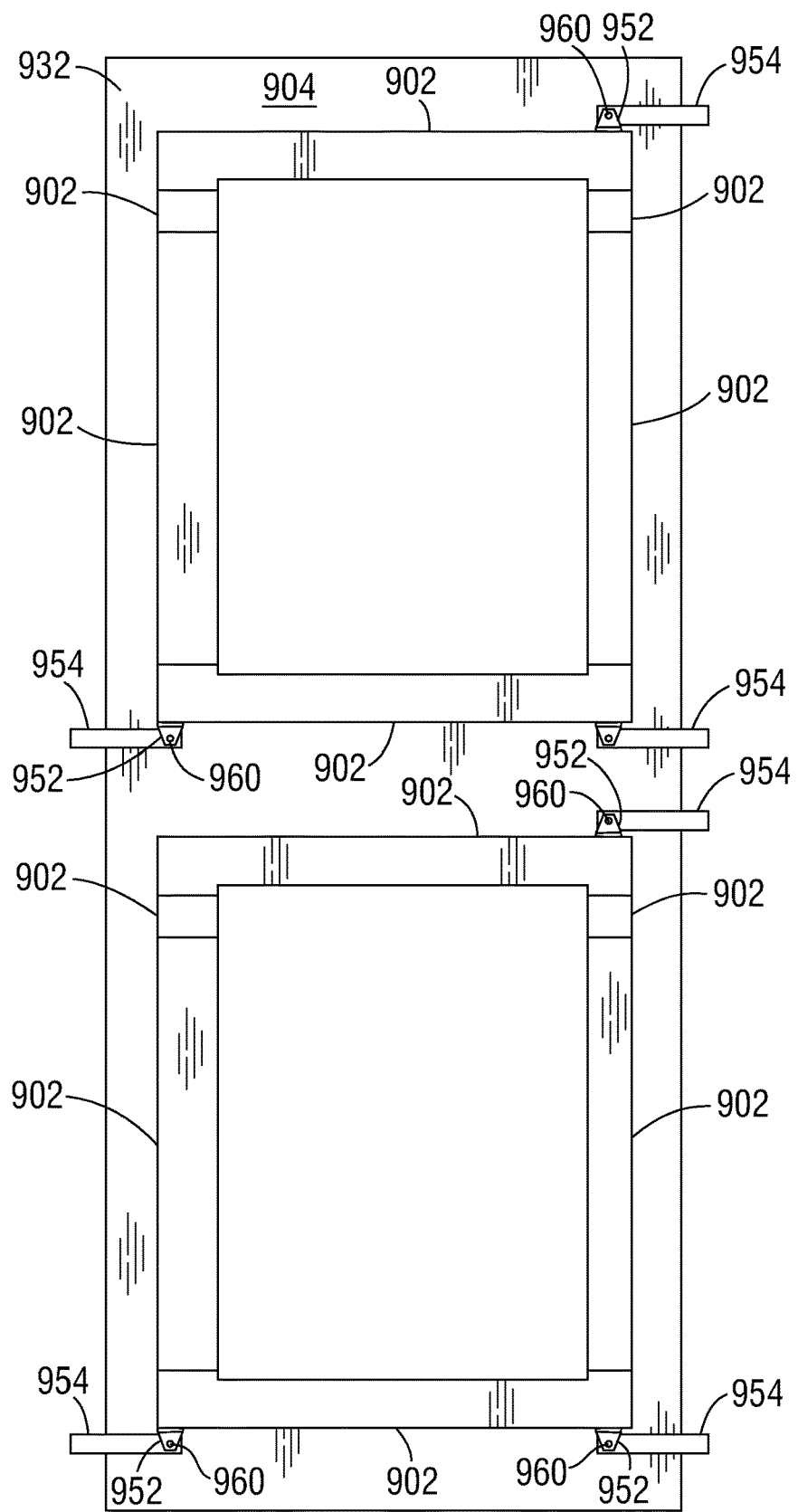
FIG. 44 is a plan view of two molding apparatuses on a base tool.

Turning to FIGS. 38-44, another embodiment of a molding apparatus 900 will now be described. Similar to the embodiment of FIG. 29, the molding apparatus 900 can comprise one or more mandrels 902 supported on a flat upper surface 932 of a base tool 904 (FIG. 44). In the embodiment shown, the mandrels 902 are configured as end mandrels 906, side mandrels 908, and extension mandrels 910. Thus, the molding apparatus shown comprises two end mandrels 906, two side mandrels 908, and two extension mandrels 910. When assembled, the mandrels 906, 908, 910 can form an interior compartment of rectangular shape above the base tool 904 with an opening above (FIG. 44) into which a fiberglass preform can be placed, as in previous embodiments. In alternative embodiments, the extension mandrels 910 can be removed, or additional extension mandrels can be added, thus allowing a user to modify the shape and/or size of the molding apparatus and, thus, of the interior compartment. Additionally, interior compartments of other shapes are possible.

As shown in FIGS. 38A and 38B, the mandrels 906, 908, 910 can also be configured to be movably disposed on dollies 912. In this manner, the mandrels 906, 908, 910 can be easily positioned, e.g., over the base tool 904, or moved around a factory floor. When the mandrels 906, 908, 910 are positioned in the desired location, the mandrels can be removed from the dollies 912.

Figure 39:
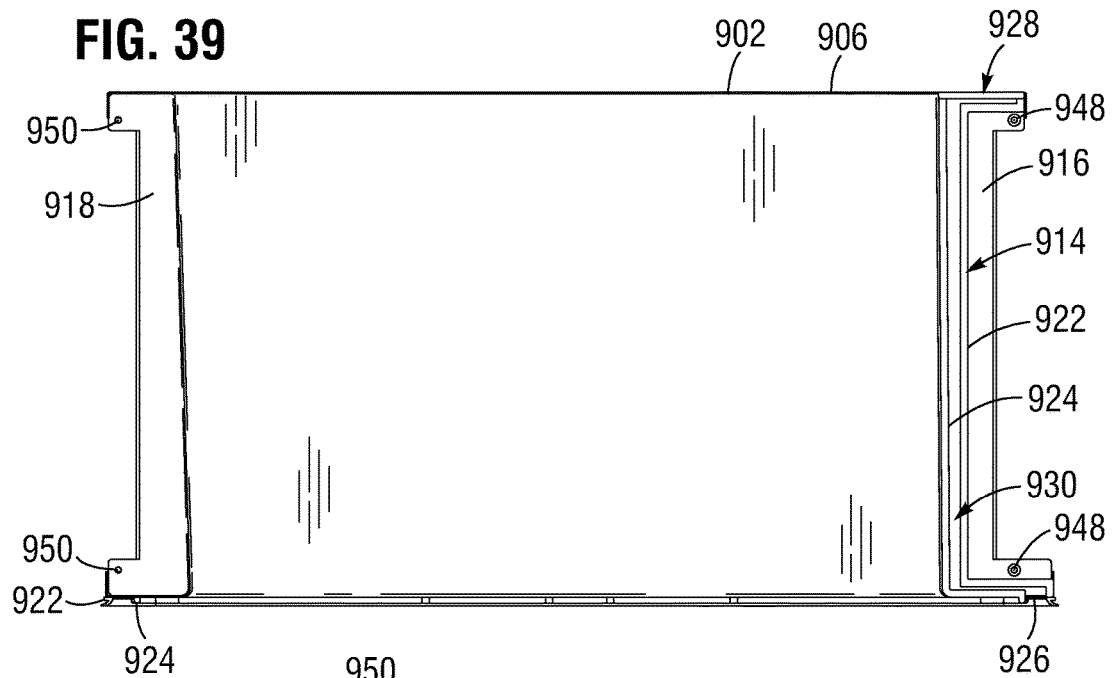
FIG. 39 is a side elevation view of a mandrel.
Figure 40:
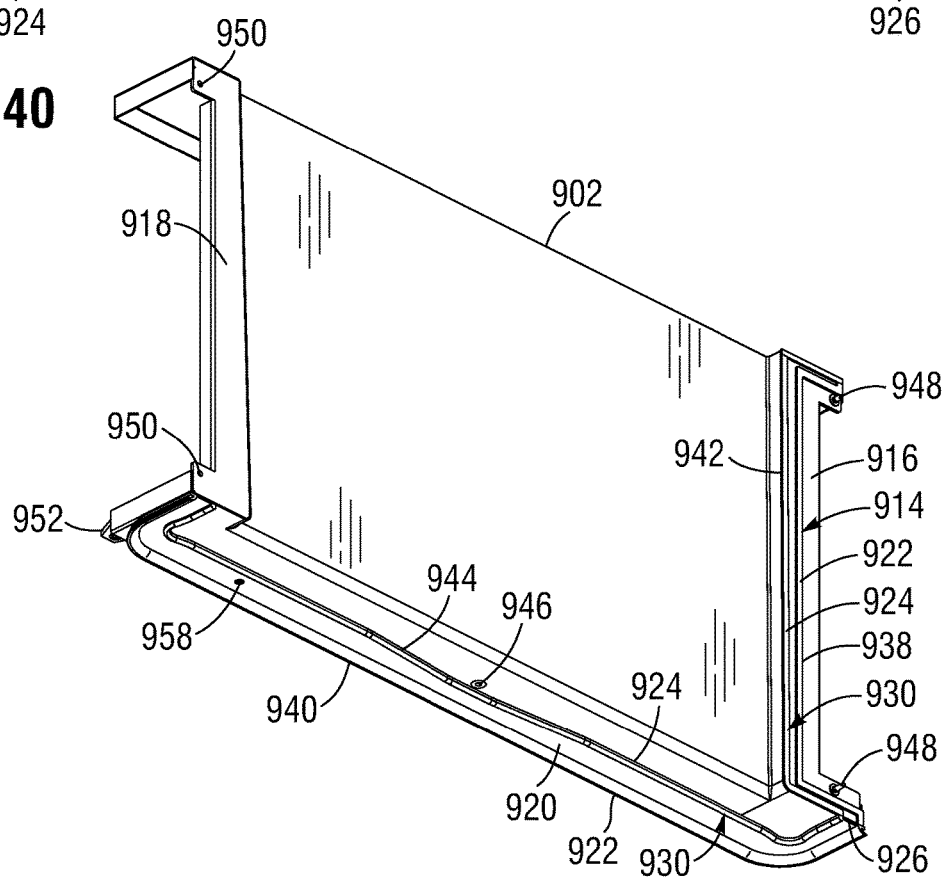
FIG. 40 is a perspective view of a mandrel.

Referring now to FIGS. 39 and 40, the molding apparatus 900 can further include a perimeter seal system comprising one or more vacuum seal arrangements 914. Although the following discussion proceeds with reference to mandrels 902 generally, it should be noted that the following discussion applies equally to all of the mandrel types disclosed above, namely, end mandrels 906, side mandrels 908, and extension mandrels 910.

As shown in FIGS. 39 and 40, the mandrels 902 can comprise first and second vertical side surfaces 916, 918, and a lower surface 920. The first side surface 916 and the lower surface 920 can have a common edge 926 (see also FIG. 41). The seal arrangement 914 can comprise a first seal 922 and a second seal 924 spaced apart from the first seal 922. In the embodiment shown, the first and second seals 922, 924 extend along the length of the first side surface 916, across the common edge 926, and along the lower surface 920. As shown in FIGS. 39 and 40, the first and second seals 922, 924 can intersect one another at an end portion 928 of the first side surface 916 opposite the common edge 926. In this manner, the first and second seals 922, 924 define a bounded area 930 along the first side surface 916 and the lower surface 920 that is continuous across the common edge 926. In alternative embodiments, the first and second seals 922, 924 can also intersect at an end portion of the lower surface 920 opposite the common edge 926. In further alternative embodiments, the first and second seals 922, 924 can extend along the length of either the first and/or second side surfaces.

The first and second seals 922, 924 can comprise continuous seals that include an integrally formed bend that extends across the common edge 926. As used herein, the term "integrally formed" refers to a construction that does not include any adhesive, fasteners, or other means for securing separately formed pieces of material to each other. In an alternative embodiment, the first and second seals 922, 924 of the lower and side surfaces, respectively, can be separate seals comprising separate pieces of material. For example, the first seal 922 can comprise a first side seal 938 and a first lower seal 940 located on the first side surface 916 and the lower surface 920, respectively. Similarly, the second seal 924 can comprise a second side seal 942 and a second lower seal 944 located on the first side surface 916 and the lower surface 920, respectively. The first side seal 938 and the first lower seal 940 can be configured such that respective ends of the seals 938, 940 intersect one another at the common edge 926. Similarly, respective ends of the second side seal 942 and the second lower seal 944 can be configured to intersect one another at the common edge 926. In this manner, the vacuum seal arrangement 914 can be configured such that the first and second seals 922, 924 can be either a single piece of material or multiple pieces of material. In the embodiment shown, the second lower seal 944 is configured as a flap seal, although the seal 944 can be configured as any suitable type of seal.

The seals 922, 924 can be formed from a resilient and/or elastomeric material, such as silicone rubber, ethylene propylene diene monomer (EPDM) rubber, neoprene, natural rubber, or various other synthetic elastomers. In some embodiments, the seals 922, 924 can be formed from different materials to reduce costs. For example, the first seal 922 can be formed from lower cost neoprene, and the second seal 924, as the seal that typically bears the greatest pressure differential and comes into contact with the resin and/or the molded part, can be made from higher quality silicone rubber. In this manner, the second seal 924 can be made from a higher cost material and the first seal 922 can be made from a lower cost material, thereby lowering the overall cost of the molding apparatus.

When arranged to form the molding apparatus, the lower surfaces 920 of the mandrels 902 can be supported by an upper surface 932 of the base tool 904 (FIG. 44). In this manner, when arranged to form the molding apparatus, the sealing arrangements 914 of the respective mandrels 902 can collectively form a continuous lower vacuum chamber 934 that extends along the upper surface of the base tool below each mandrel, as shown in FIGS. 42 and 43. Thus, the lower vacuum chamber 934 can be bounded by the lower surfaces 916 of the mandrels, the upper surface 932 of the base tool, and the first and second seals 922, 924 of each mandrel (i.e., the lower vacuum chamber can be continuous among all of the mandrels 902, and hence along the entire perimeter of the molding apparatus).

Similarly, the mandrels can be configured such that the first side surface 916 of each mandrel is opposite the second side surface 918 of the adjacent mandrel, and vice versa. Still referring to FIGS. 42 and 43, the first side surface 916, the second side surface 918, and the first and second seals 922, 924 can create a side vacuum chamber 936 wherever the first and second side surfaces 916, 918 of respective adjacent mandrels are opposed. Thus, each of the side vacuum chambers 936 can be in fluid communication with the lower vacuum chamber 934 because the bounded area 930 defined by the first and second seals 922, 924 is continuous across the common edge 926 between the first side surface 916 and the lower surface 920 of each mandrel.

Referring again to FIG. 40, at least one of the mandrels 902 can have a vacuum port, such as the vacuum port 958, located within the bounded area 930. In this manner, a vacuum can be established in the lower vacuum chamber 934 and each of the side vacuum chambers 936 with a single vacuum port owing to the fluid communication between the lower vacuum chamber 934 and each of the side vacuum chambers 936. In alternative embodiments, more than one mandrel 902 can include a vacuum port 958 so as to promote faster establishment of a vacuum in the vacuum chambers 934, 936. For example, each of the end mandrels 908 can have a vacuum port 958, allowing air to be quickly drawn out of the vacuum chambers 934, 936 from both ends of the molding apparatus.

Referring to FIGS. 40 and 42, one or more of the mandrels 902 can include a fluid port 946 located on the interior side of the vacuum seal arrangement 914 (i.e., inside the interior compartment). As in previous embodiments, the molding apparatus 900 can be used to form the fiberglass shell 102 of the slide-room 100 using a vacuum-assisted resin transfer molding process. A preform (such as the preform 400) can be positioned between the base tool/mandrels 904/902 and an infusion bag (such as the infusion bag 152). Insertion of the infusion bag defines an infusion space between the infusion bag, the interior faces of the mandrels, and the base tool. The preform occupies portions of the infusion space. To enable the molding process, fluid ports 946 used as vacuum ports can draw a vacuum on the infusion space. As in previous embodiments, the one or more fluid ports 946 can pass through the infusion bag and/or the mandrels 902 and/or the base tool 904. As shown in FIGS. 40 and 42, the vacuum seal arrangement 914 and, more particularly, the second seal 924, can be configured to pass around the fluid ports 946 such that the fluid ports 946 are in fluid communication with the interior compartment and not with the peripheral sealing system.

Figure 41:
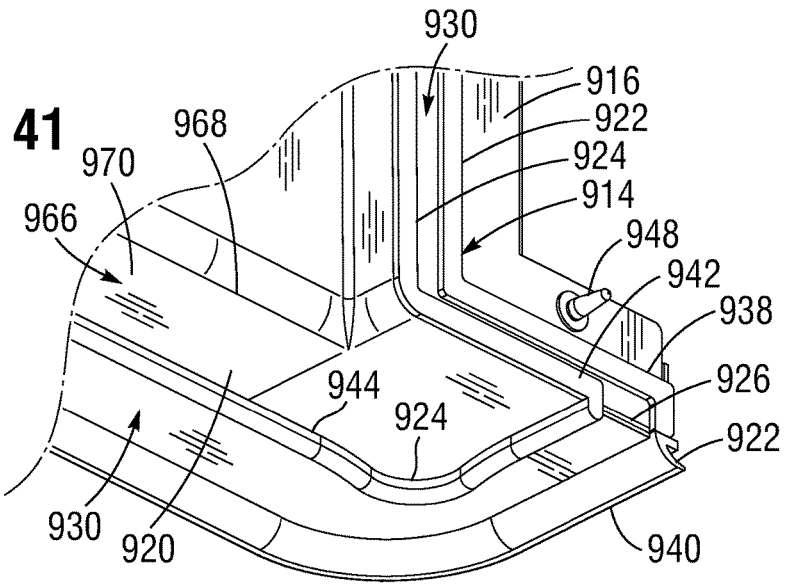
FIG. 41 is an enlarged view of a section of FIG. 40 showing a continuous perimeter vacuum chamber.

As shown in FIGS. 41 and 42, an interior area 966 defined on the lower surface 920 of the mandrels by the second seal 924 and the interior edge 968 can form an interior recess 970 between the mandrel lower surfaces 920 and the base tool upper surface 932 when the mandrels are arranged on the upper surface 932 of the base tool 904. In this manner, edge portions of the preform 400 can extend into the recesses 970 during fabrication of the slide-room to form the flange of the slide-room. As described above with respect to previous embodiments, the thickness or diameter of the first and second seals 922, 924 can define the height of the interior recess 970 and, thus, the thickness of the slide-room flange.

Referring now to FIGS. 39 and 40, the mandrels 902 can include one or more alignment pins 948 and one or more corresponding pin-receiving recesses or apertures 950. In the embodiment shown, the alignment pins 948 are located on the first side surface 916 and the pin-receiving recesses 950 are located on the second side surface 918. In this manner, the pin-receiving recesses 950 can be configured to receive the alignment pins 948 of the adjacent mandrel when the molding apparatus is assembled, and thereby retain the mandrels in the desired orientation. In alternative embodiments, the alignment pins 948 and pin-receiving recesses 950 can be located on any suitable surface of the mandrels.

The mandrels 902 can also include one or more mandrel alignment elements 952 configured to mate with corresponding base tool alignment elements 954, as shown in FIGS. 42-44. In the embodiment shown, the mandrel alignment elements 952 are flanges rigidly mounted to the end mandrels 906. The mandrel alignment elements 952 can have holes 956 configured to receive, for example, upwardly disposed pins 960 mounted to the base tool alignment elements 954, as shown in FIG. 43. In the embodiment shown, one of the end mandrels 906 can have two mandrel alignment elements 952 mated to two corresponding base tool alignment elements 954, while the second end mandrel 906 can have a single mandrel alignment element 952 mated to a single corresponding base tool alignment element 954. In this manner, three corners of the molding apparatus can be squared with respect to each other and the base tool 904, while allowing the fourth corner to adjustably compensate for slight errors in the alignment of the other three corners. In alternative embodiments, each of the end mandrels 906 can comprise two mandrel alignment elements 952, and base tool alignment elements 954 can be mated to three, or all four, of the mandrel alignment elements, as desired. In further alternative embodiments, the side mandrels 908 and/or the extension mandrels 910 can also include mandrel alignment elements 952.

The base tool alignment elements 954 can be, for example, brackets, and can be positionable along the length or width of the base tool 904 by, for example, being disposed in a track or raceway (not shown). As disclosed above, the base tool 904 can comprise a flat upper surface 932 sized to support and align the mandrels. As shown in FIG. 43, the base tool 904 can also be sized to support two or more mold apparatus assemblies at one time, allowing the production of multiple composite parts of the same or differing sizes at the same time.

Turning now to methods of forming a fiberglass part, a plurality of mandrels 902 can be positioned on a base tool 904 such that the lower surfaces 920 of the mandrels are arranged on and supported by the upper surface 932 of the base tool. The first side surfaces 916 and the lower surfaces 920 of the mandrels 902 can have vacuum seal arrangements 914 positioned thereon, as disclosed above. The mandrel alignment elements 952 and base tool alignment elements 954 can be mated, and the alignment pins 948 and the pin-receiving recesses 950 can be mated such that the mandrels define an interior compartment with an opening above. The vacuum seal arrangements 914 of the first side surfaces 916 and the lower surfaces 918 of the mandrels, together with the opposed second side surfaces 918 and the upper surface 932 of the base tool, can define a continuous vacuum chamber extending around the perimeter of the molding assembly. Next, a fiberglass preform (such as the preform 400) can be positioned in the interior compartment such that a first section (e.g., the base section 402) of the preform extends along the base tool 904, and edge portions (e.g., edge portions 416, 418, 420, and 422) surrounding the first section extend into the recesses 970 formed between the base tool 904 and the lower surfaces 920 of the mandrels 902. Second, third, fourth, and fifth sections (e.g., sections 404, 406, 408, 410) of the preform are then folded upwardly against the adjacent surfaces of the respective mandrels, and an infusion bag (such as infusion bag 152) can be positioned in the interior compartment over the preform so as to create an infusion space (similar to the arrangement of FIG. 32). Using one or more of the vacuum ports 958, a vacuum can be established in the continuous vacuum chamber. In some embodiments, the opposed first and second side surfaces of the mandrels can be clamped together to promote sealing with, for example, clamps (e.g., clamps 710 of FIG. 29B), vice grips, channel locks, etc. However, in alternative embodiments, the opposing first and second side surfaces of the mandrels can be held together and sealed by the force of the vacuum applied to the continuous vacuum chamber.

After placing a weight or fixture on top of the molding assembly to facilitate sealing between the infusion bag and the tops of the mandrels, a second vacuum can be established in the infusion space using one or more of the interior fluid ports 946. In some embodiments, the pressure of the first vacuum (i.e., the vacuum established in the continuous vacuum chamber) can be lower than the pressure of the second vacuum established in the infusion space. In this manner, outside air that leaks past the seal arrangement 914 can be drawn into the continuous vacuum chamber, from which it can be easily withdrawn, and not into the infusion space.

Resin can then be introduced through one or more of the interior fluid ports 946 and allowed to flow over and through the fiberglass preform. The resin can then be allowed to cure to form a fiberglass part. When cured, the finished part can be removed from the mold.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A mandrel for use in molding a composite part, comprising:
    a side surface and a lower surface, the side surface and the lower surface having a common edge; and
    a vacuum seal arrangement located along the lower surface and the side surface of the mandrel, the vacuum seal arrangement comprising a first seal and a second seal spaced apart from the first seal such that the first and second seals define a bounded area therebetween, the first and second seals extending from the side surface to the lower surface across the common edge such that the first seal, the second seal, and the bounded area are continuous across the common edge.

2. The mandrel of claim 1, wherein the first and second seals intersect one another at an end portion of the side surface opposite the common edge.

3. The mandrel of claim 1, wherein the first and second seals intersect one another at an end portion of the lower surface opposite the common edge.

4. The mandrel of claim 1, wherein the first seal comprises a flap seal.

5. The mandrel of claim 1, wherein:
    the first seal comprises a first side seal extending along the side surface of the mandrel and a first lower seal extending along the lower surface of the mandrel; and
    the second seal comprises a second side seal extending along the side surface of the mandrel and a second lower seal extending along the lower surface of the mandrel;
    wherein the first side seal and the first lower seal, and the second side seal and the second lower seal, respectively, intersect one another at the common edge of the lower surface and the side surface of the mandrel.

6. The mandrel of claim 1, further comprising at least one vacuum port in communication with the bounded area.

7. The mandrel of claim 1, wherein the second seal is spaced apart from an edge of the lower surface of the mandrel such that the second seal and the edge define a second area on the lower surface of the mandrel configured to receive an edge portion of a preform.

8. A molding apparatus for molding composite parts, comprising:
    a plurality of mandrels, each mandrel having first and second side surfaces and a lower surface, wherein the mandrels are arranged such that the first side surface of each respective mandrel opposes the second side surface of the adjacent mandrel;
    a base tool having an upper surface on which the plurality of mandrels are arranged, the mandrels and base tool together defining an interior compartment with an opening above; and
    a vacuum seal arrangement located along the lower surface and the first side surface of each mandrel, the vacuum seal arrangement comprising a first seal and a second seal spaced apart from the first seal such that the first and second seals define a bounded area therebetween, the first seal, the second seal, and the bounded area being continuous across a common edge between the lower surface and the first side surface of each mandrel;
    wherein the vacuum seal arrangements, the lower surfaces of the mandrels, and the upper surface of the base tool collectively define a continuous vacuum chamber between the lower surfaces of the mandrels and the upper surface of the base tool;
    wherein the vacuum seal arrangements, the first side surfaces, and the second side surfaces of respective adjacent mandrels each define a respective vacuum chamber wherever the first and second side surfaces of respective adjacent mandrels are opposed; and
    wherein the vacuum chamber between the lower surfaces of the mandrels and the upper surface of the base tool is fluidly connected to each of the respective vacuum chambers between opposed side surfaces of adjacent mandrels.

9. The molding apparatus of claim 8, further comprising at least one vacuum port in communication with at least one of the vacuum chambers.

10. The molding apparatus of claim 8, wherein:
    the first seal of each mandrel comprises a first lower seal extending along a length of the lower surface of each mandrel and a first side seal on the first side surface of each mandrel;
    the second seal of each mandrel comprises a second lower seal extending along the length of the lower surface of each mandrel and a second side seal on the first side surface of each mandrel; and
    ends of the first and second lower seals of each mandrel contact adjacent ends of first and second lower seals of an adjacent mandrel.

11. The molding apparatus of claim 10, wherein the first and second side seals have respective lower ends that contact respective ends of the first and second lower seals on the lower surface of the same mandrel.

12. The molding apparatus of claim 8, wherein the base tool is configured to support at least two molding assemblies at one time.

13. The molding apparatus of claim 8, wherein the first side surface comprises at least one alignment pin and the second side surface comprises at least one pin-receiving recess, wherein the alignment pin of each mandrel is received in a recess of an adjacent mandrel.

14. The molding apparatus of claim 8, further comprising at least one bracket positionable along the length of the base tool, the bracket comprising at least one alignment element configured to mate with a corresponding alignment element on one of the mandrels.

15. A method for forming a fiberglass part, comprising:

positioning a plurality of mandrels on a base tool, each mandrel having a lower surface and first and second side surfaces, the base tool having an upper surface on which the plurality of mandrels are arranged, the mandrels and base tool together defining an interior compartment with an opening above, each mandrel comprising a vacuum seal arrangement located along the lower surface and the first side surface, the vacuum seal arrangement comprising a first seal and a second seal spaced apart from the first seal such that the first and second seals define a bounded area therebetween, the first seal, the second seal, and the bounded area being continuous across a common edge between the lower surface and the first side surface of each mandrel, the mandrels being positioned such that the vacuum seal arrangements, the lower surfaces of the mandrels, and the upper surface of the base tool collectively define a continuous vacuum chamber between the lower surfaces of the mandrels and the upper surface of the base tool, and such that the vacuum seal arrangements, the first side surfaces, and the second side surfaces of respective adjacent mandrels each define a respective vacuum chamber wherever the first and second side surfaces of respective adjacent mandrels are opposed, the continuous vacuum chamber between the lower surfaces of the mandrels and the upper surface of the base tool being fluidly connected to each of the respective vacuum chambers between opposed side surfaces of adjacent mandrels;

positioning a fiberglass preform in the interior compartment;

positioning an infusion bag in the interior compartment over the fiberglass preform;

introducing a resin into the mold so that it flows over and through the preform; and allowing the resin to cure to form a fiberglass part.

16. The method of claim 15 further comprising:

establishing a first vacuum in the continuous vacuum chamber; and establishing a second vacuum in the space occupied by the preform;

wherein the pressure of the first vacuum is lower than the pressure of the second vacuum.

17. The method of claim 15, further comprising clamping surfaces of opposed mandrels to facilitate sealing.

18. The method of claim 15, wherein the positioning a plurality of mandrels further comprises:

mounting one or more of the plurality of mandrels on one or more brackets supported by the base tool such that the plurality of mandrels are maintained in a rectangular arrangement.

19. The method of claim 15, further comprising:

locating an edge portion of the fiberglass preform in a space between the lower surfaces of the mandrels and the upper surface of the base tool.

* * * * *